US007231060B2

(12) United States Patent
Dowling et al.

(10) Patent No.: US 7,231,060 B2
(45) Date of Patent: Jun. 12, 2007

(54) SYSTEMS AND METHODS OF GENERATING CONTROL SIGNALS

(75) Inventors: Kevin J. Dowling, Westford, MA (US); Frederick M. Morgan, Quincy, MA (US); Ihor A. Lys, Milton, MA (US); Brian Chemel, Salem, MA (US); Michael K. Blackwell, Milton, MA (US); John Warwick, Cambridge, MA (US)

(73) Assignee: Color Kinetics Incorporated, Boston, MA (US)

( * ) Notice: Subject to any disclaimer, the term of this patent is extended or adjusted under 35 U.S.C. 154(b) by 1037 days.

(21) Appl. No.: 10/163,164

(22) Filed: Jun. 5, 2002

(65) Prior Publication Data

US 2004/0212320 A1 Oct. 28, 2004

Related U.S. Application Data

(63) Continuation-in-part of application No. 09/971,367, filed on Oct. 4, 2001, now Pat. No. 6,788,011, which (Continued)

(60) Provisional application No. 60/341,476, filed on Oct. 30, 2001, provisional application No. 60/328,867, filed on Oct. 12, 2001, provisional application No. 60/301,692, filed on Jun. 28, 2001, provisional application No. 60/296,344, filed on Jun. 6, 2001, provisional application No. 60/296,219, filed on Jun. 6, 2001, provisional application No. 60/277,911, filed on Mar. 22, 2001, provisional application No. 60/268,259, filed on Feb. 13, 2001, provisional application No. 60/262,153, filed on Jan. 17, 2001, provisional application No. 60/262,022, filed on Jan. 16, 2001, provisional application No. 60/252,004, filed on Nov. 20, 2000, provisional application No. 60/242,484, filed on Oct. 23, 2000, provisional application No. 60/090,920, filed on Jun. 26, 1998, provisional application No. 60/079,285, filed on Mar. 25, 1998, provisional application No. 60/078,861, filed on Mar. 20, 1998, provisional application No. 60/068,792, filed on Dec. 24, 1997, provisional application No. 60/071,281, filed on Dec. 17, 1997.

(51) Int. Cl.
*G06K 9/00* (2006.01)

(52) U.S. Cl. .......................... 382/100; 700/66; 700/86

(58) Field of Classification Search ................ 382/100; 715/965, 970.1; 700/56, 61, 62, 64, 66, 83, 700/86; 84/464 R; 315/292, 294, 316, 317, 315/318, 319, 360; 362/85, 233, 234, 253, 362/286, 319, 386

See application file for complete search history.

(56) References Cited

U.S. PATENT DOCUMENTS 2,909,097 A 10/1959 Alden et al. .................. 88/24

(Continued)

FOREIGN PATENT DOCUMENTS

AU 6 267 9/96 B 12/1996

(Continued)

OTHER PUBLICATIONS

International Search Report from PCT Application PCT/US02/17773.

(Continued)

*Primary Examiner*—Andrew W. Johns
(74) *Attorney, Agent, or Firm*—Wolf, Greenfield & Sacks, P.C.

(57) ABSTRACT

Separating a source in a stereo signal having a left channel and a right channel includes transforming the signal into a short-time transform domain; computing a short-time similarity measure between the left channel and the right channel; classifying portions of the signals having similar panning coefficients according to the short-time similarity measure; segregating a selected one of the classified portions of the signals corresponding to the source; and reconstructing the source from the selected portions of the signals.

228 Claims, 12 Drawing Sheets

Related U.S. Application Data is a continuation of application No. 09/669,121, filed on Sep. 25, 2000, now Pat. No. 6,806,659, which is a continuation of application No. 09/425,770, filed on Oct. 22, 1999, now Pat. No. 6,150,774, which is a continuation of application No. 08/920,156, filed on Aug. 26, 1997, now Pat. No. 6,016,038, application No. 10/163,164, which is a continuation-in-part of application No. 09/870,193, filed on May 30, 2001, now Pat. No. 6,608,453, and a continuation-in-part of application No. 09/815,418, filed on Mar. 22, 2001, now Pat. No. 6,577,080, and a continuation-in-part of application No. 09/333,739, filed on Jun. 15, 1999, and a continuation-in-part of application No. 09/215, 624, filed on Dec. 17, 1998, now Pat. No. 6,528,954, and a continuation-in-part of application No. 09/213, 607, filed on Dec. 17, 1998, now abandoned, and a continuation-in-part of application No. 09/213,189, filed on Dec. 17, 1998, now Pat. No. 6,459,919, and a continuation-in-part of application No. 09/213,581, filed on Dec. 17, 1998, now Pat. No. 7,038,398, and a continuation-in-part of application No. 09/213,540, filed on Dec. 17, 1998, now Pat. No. 6,720,745, which is a continuation of application No. 09/213, 548, filed on Dec. 17, 1998, now Pat. No. 6,166,496, application No. 10/163,164, and a continuation-in-part of application No. 09/989,095, filed on Nov. 20, 2001, now Pat. No. 6,717,376, and a continuation-in-part of application No. 09/989,747, filed on Nov. 20, 2001, now Pat. No. 6,897,624, and a continuation-in-part of application No. 09/989,677, filed on Nov. 20, 2001, which is a continuation-in-part of application No. 10/045,604, filed on Oct. 23, 2001.

(56) References Cited

U.S. PATENT DOCUMENTS

| | | | | |
|---|---|---|---|---|
| 3,318,185 | A | 5/1967 | Kott | 88/24 |
| 3,561,719 | A | 2/1971 | Grindle | 248/343 |
| 3,586,936 | A | 6/1971 | McLeroy | 318/118 |
| 3,601,621 | A | 8/1971 | Ritchie et al. | 307/116 |
| 3,643,088 | A | 2/1972 | Osteen et al. | 340/52 |
| 3,746,918 | A | 7/1973 | Drucker et al. | 317/77 |
| 3,818,216 | A | 6/1974 | Larraburu | 240/41.3 |
| 3,832,503 | A | 8/1974 | Crane | 200/51 R |
| 3,858,086 | A | 12/1974 | Anderson et al. | 315/49 |
| 3,909,670 | A | 9/1975 | Wakamatsu et al. | 315/276 |
| 3,924,120 | A | 12/1975 | Cox, III | 250/199 |
| 3,958,885 | A | 5/1976 | Stockinger et al. | 356/139 |
| 3,974,637 | A | 8/1976 | Bergey et al. | 58/50 R |
| 4,001,571 | A | 1/1977 | Martin | 240/9 R |
| 4,054,814 | A | 10/1977 | Fegley et al. | 315/71 |
| 4,070,568 | A | 1/1978 | Gala | 362/311 |
| 4,082,395 | A | 4/1978 | Donato et al. | 339/21 R |
| 4,096,349 | A | 6/1978 | Donato | 174/68 R |
| 4,241,295 | A | 12/1980 | Williams, Jr. | 315/294 |
| 4,271,408 | A | 6/1981 | Teshima et al. | 340/702 |
| 4,272,689 | A | 6/1981 | Crosby et al. | 307/147 |
| 4,273,999 | A | 6/1981 | Pierpoint | 250/205 |
| 4,298,869 | A | 11/1981 | Okuno | 340/782 |
| 4,329,625 | A | 5/1982 | Nishizawa et al. | 315/158 |
| 4,367,464 | A | 1/1983 | Kurahashi et al. | 340/701 |
| 4,388,567 | A | 6/1983 | Yamazaki et al. | 315/291 |
| 4,388,589 | A | 6/1983 | Molldrem, Jr. | 324/96 |
| 4,392,187 | A | 7/1983 | Bornhorst | 362/233 |
| 4,420,711 | A | 12/1983 | Takahashi et al. | 315/296 |
| 4,500,796 | A | 2/1985 | Quin | 307/147 |
| 4,527,198 | A | 7/1985 | Callahan | 358/185 |
| 4,597,033 | A | 6/1986 | Meggs et al. | 362/183 |
| 4,622,881 | A | 11/1986 | Rand | 84/464 R |
| 4,625,152 | A | 11/1986 | Nakai | 315/317 |
| 4,635,052 | A | 1/1987 | Aoike et al. | 340/811 |
| 4,647,217 | A | 3/1987 | Havel | 368/10 |
| 4,656,398 | A | 4/1987 | Michael et al. | 315/293 |
| 4,668,895 | A | 5/1987 | Schneiter | 315/158 |
| 4,682,079 | A | 7/1987 | Sanders et al. | 315/186 |
| 4,686,425 | A | 8/1987 | Havel | 315/152 |
| 4,687,340 | A | 8/1987 | Havel | 368/10 |
| 4,688,154 | A | 8/1987 | Nilssen | 362/147 |
| 4,688,869 | A | 8/1987 | Kelly | 439/209 |
| 4,695,769 | A | 9/1987 | Schweickardt | 315/158 |
| 4,697,227 | A | 9/1987 | Callahan | 362/233 |
| 4,701,669 | A | 10/1987 | Head et al. | 315/155 |
| 4,705,406 | A | 11/1987 | Havel | 368/10 |
| 4,707,141 | A | 11/1987 | Havel | 368/11 |
| 4,727,289 | A | 2/1988 | Uchida | 315/71 |
| 4,740,882 | A | 4/1988 | Miller | 364/132 |
| 4,753,148 | A | 6/1988 | Johnson | 84/464 R |
| 4,771,274 | A | 9/1988 | Havel | 340/703 |
| 4,780,621 | A | 10/1988 | Bartleucci et al. | 307/11 |
| 4,794,383 | A | 12/1988 | Havel | 340/704 |
| 4,797,795 | A | 1/1989 | Callahan | 362/233 |
| 4,818,072 | A | 4/1989 | Mohebban | 350/336 |
| 4,824,269 | A | 4/1989 | Havel | 400/704 |
| 4,837,565 | A | 6/1989 | White | 340/762 |
| 4,843,627 | A | 6/1989 | Stebbins | 381/110 |
| 4,845,481 | A | 7/1989 | Havel | 340/762 |
| 4,845,745 | A | 7/1989 | Havel | 379/354 |
| 4,857,801 | A | 8/1989 | Farrell | 315/500 |
| 4,863,223 | A | 9/1989 | Weissenbach et al. | 312/209 |
| 4,874,320 | A | 10/1989 | Freed et al. | 439/115 |
| 4,887,074 | A | 12/1989 | Simon et al. | 340/782 |
| 4,894,760 | A | 1/1990 | Callahan | 362/293 |
| 4,922,154 | A | 5/1990 | Cacoub | 315/149 |
| 4,934,852 | A | 6/1990 | Havel | 400/704 |
| 4,947,302 | A | 8/1990 | Callahan | 362/233 |
| 4,962,687 | A | 10/1990 | Belliveau et al. | 84/464 R |
| 4,965,561 | A | 10/1990 | Havel | 340/762 |
| 4,973,835 | A | 11/1990 | Kurosu et al. | 250/214 AL |
| 4,979,081 | A | 12/1990 | Leach et al. | 362/219 |
| 4,980,806 | A | 12/1990 | Taylor et al. | 362/85 |
| 4,992,704 | A | 2/1991 | Stinson | 315/312 |
| 5,003,227 | A | 3/1991 | Nilssen | 315/161 |
| 5,008,595 | A | 4/1991 | Kazar | 315/178 |
| 5,008,788 | A | 4/1991 | Palinkas | 362/231 |
| 5,010,459 | A | 4/1991 | Taylor et al. | 362/85 |
| 5,027,262 | A | 6/1991 | Freed | 362/249 |
| 5,034,807 | A | 7/1991 | Von Kohorn | 358/84 |
| 5,036,248 | A | 7/1991 | McEwan et al. | 313/500 |
| 5,038,255 | A | 8/1991 | Nishihashi et al. | 362/61 |
| 5,061,997 | A | 10/1991 | Rea et al. | 358/108 |
| 5,072,216 | A | 12/1991 | Grange | 340/825.52 |
| 5,078,039 | A | 1/1992 | Tulk et al. | 84/464 R |
| 5,083,063 | A | 1/1992 | Brooks | 315/294 |
| 5,122,733 | A | 6/1992 | Havel | 324/115 |
| 5,126,634 | A | 6/1992 | Johnson | 315/71 |
| 5,128,595 | A | 7/1992 | Hara | 315/312 |
| 5,130,909 | A | 7/1992 | Gross | 362/153 |
| 5,134,387 | A | 7/1992 | Smith et al. | 340/701 |
| 5,142,199 | A | 8/1992 | Elwell | 315/154 |
| 5,154,641 | A | 10/1992 | McLaughlin | 439/621 |
| 5,164,715 | A | 11/1992 | Kashiwabara et al. | 340/176 |
| 5,184,114 | A | 2/1993 | Brown | 340/701 |
| 5,194,854 | A | 3/1993 | Havel | 340/815.1 |
| 5,209,560 | A | 5/1993 | Taylor et al. | 362/85 |
| 5,225,765 | A | 7/1993 | Callahan et al. | 323/235 |
| 5,226,723 | A | 7/1993 | Chen | 362/241 |
| 5,254,910 | A | 10/1993 | Yang | 315/313 |
| 5,256,948 | A | 10/1993 | Boldin et al. | 315/313 |
| 5,278,542 | A | 1/1994 | Smith et al. | 345/150 |
| 5,282,121 | A | 1/1994 | Bornhorst et al. | 362/294 |

| | | | | |
|---|---|---|---|---|
| 5,283,517 | A | 2/1994 | Havel | 324/115 |
| 5,294,865 | A | 3/1994 | Haraden | 315/58 |
| 5,298,871 | A | 3/1994 | Shimohara | 332/109 |
| 5,307,295 | A | 4/1994 | Taylor et al. | 364/578 |
| 5,329,431 | A | 7/1994 | Taylor et al. | 362/85 |
| 5,350,977 | A | 9/1994 | Hamamoto et al. | 315/291 |
| 5,357,170 | A | 10/1994 | Luchaco et al. | 315/159 |
| 5,371,618 | A | 12/1994 | Tai et al. | 359/53 |
| 5,374,876 | A | 12/1994 | Horibata et al. | 315/313 |
| 5,375,043 | A | 12/1994 | Tokunaga | 362/31 |
| 5,381,074 | A | 1/1995 | Rudzewicz et al. | 315/77 |
| 5,388,357 | A | 2/1995 | Malita | 40/570 |
| 5,392,431 | A | 2/1995 | Pfisterer | 359/653 |
| 5,402,702 | A | 4/1995 | Hata | 84/464 R |
| 5,404,282 | A | 4/1995 | Klinke et al. | 362/249 |
| 5,406,176 | A | 4/1995 | Sugden | 315/292 |
| 5,410,328 | A | 4/1995 | Yoksza et al. | 345/82 |
| 5,412,284 | A | 5/1995 | Moore et al. | 315/155 |
| 5,412,552 | A | 5/1995 | Fernandes | 362/250 |
| 5,420,482 | A | 5/1995 | Phares | 315/292 |
| 5,421,059 | A | 6/1995 | Leffers, Jr. | 16/87.4 R |
| 5,432,408 | A | 7/1995 | Matsuda et al. | 315/200 R |
| 5,436,535 | A | 7/1995 | Yang | 315/313 |
| 5,436,853 | A | 7/1995 | Shimohara | 364/569 |
| 5,450,301 | A | 9/1995 | Waltz et al. | 362/231 |
| 5,461,188 | A | 10/1995 | Drago et al. | 84/600 |
| 5,463,280 | A | 10/1995 | Johnson | 315/187 |
| 5,465,144 | A | 11/1995 | Parker et al. | 356/139.06 |
| 5,475,300 | A | 12/1995 | Havel | 324/115 |
| 5,489,827 | A | 2/1996 | Xia | 315/294 |
| 5,491,402 | A | 2/1996 | Small | 323/282 |
| 5,493,183 | A | 2/1996 | Kimball | 315/308 |
| 5,504,395 | A | 4/1996 | Johnson et al. | 315/71 |
| 5,519,496 | A | 5/1996 | Borgert et al. | 356/394 |
| 5,545,950 | A | 8/1996 | Cho | 315/56 |
| 5,559,681 | A | 9/1996 | Duarte | 362/252 |
| 5,561,346 | A | 10/1996 | Byrne | 313/512 |
| 5,575,459 | A | 11/1996 | Anderson | 362/240 |
| 5,575,554 | A | 11/1996 | Guritz | 362/103 |
| 5,592,051 | A | 1/1997 | Korkala | 315/210 |
| 5,614,788 | A | 3/1997 | Mullins et al. | 315/82 |
| 5,621,282 | A | 4/1997 | Haskell | 315/324 |
| 5,634,711 | A | 6/1997 | Kennedy et al. | 362/115 |
| 5,640,061 | A | 6/1997 | Bornhorst et al. | 307/150 |
| 5,642,129 | A | 6/1997 | Zavracky et al. | 345/100 |
| 5,656,935 | A | 8/1997 | Havel | 324/115 |
| 5,668,537 | A * | 9/1997 | Chansky et al. | 340/825.06 |
| 5,673,059 | A | 9/1997 | Zavracky et al. | 345/8 |
| 5,701,058 | A | 12/1997 | Roth | 315/158 |
| 5,712,650 | A | 1/1998 | Barlow | 345/55 |
| 5,721,471 | A | 2/1998 | Begemann et al. | 315/158 |
| 5,734,590 | A | 3/1998 | Tebbe | 364/514 A |
| 5,751,118 | A | 5/1998 | Mortimer | 315/291 |
| 5,752,766 | A | 5/1998 | Bailey et al. | 362/250 |
| 5,769,527 | A | 6/1998 | Taylor et al. | 362/85 |
| 5,803,579 | A | 9/1998 | Turnbull et al. | 362/83.1 |
| 5,808,689 | A | 9/1998 | Small | 348/476 |
| 5,821,695 | A | 10/1998 | Vilanilam et al. | 315/58 |
| 5,836,676 | A | 11/1998 | Ando et al. | 362/244 |
| 5,848,837 | A | 12/1998 | Gustafson | 362/235 |
| 5,850,126 | A | 12/1998 | Kanbar | 315/200 A |
| 5,851,063 | A | 12/1998 | Doughty et al. | 362/231 |
| 5,852,658 | A | 12/1998 | Knight et al. | 379/106.03 |
| RE36,030 | E | 1/1999 | Nadeau | 439/115 |
| 5,859,508 | A | 1/1999 | Ge et al. | 315/366 |
| 5,896,010 | A | 4/1999 | Mikolajczak et al. | 315/77 |
| 5,912,653 | A | 6/1999 | Fitch | 345/87 |
| 5,923,363 | A | 7/1999 | Elberbaum | 348/156 |
| 5,924,784 | A | 7/1999 | Chliwnyj et al. | 362/234 |
| 5,927,845 | A | 7/1999 | Gustafson et al. | 362/152 |
| 5,945,988 | A | 8/1999 | Williams et al. | 345/327 |
| 5,946,209 | A | 8/1999 | Eckel et al. | 364/143 |
| 5,952,680 | A | 9/1999 | Strite | 257/88 |
| 5,959,547 | A | 9/1999 | Tubel et al. | 340/853.2 |
| 5,963,185 | A | 10/1999 | Havel | 345/83 |
| 5,969,485 | A | 10/1999 | Hunt | 315/292 |
| 5,974,553 | A | 10/1999 | Gandar | 713/300 |
| 5,980,064 | A | 11/1999 | Metroyanis | 362/194 |
| 6,008,783 | A | 12/1999 | Kitagawa et al. | 345/39 |
| 6,016,038 | A | 1/2000 | Mueller et al. | 315/291 |
| 6,018,237 | A | 1/2000 | Havel | 324/115 |
| 6,025,550 | A | 2/2000 | Kato | 84/464 A |
| 6,031,343 | A | 2/2000 | Recknagel et al. | 315/292 |
| 6,068,383 | A | 5/2000 | Robertson et al. | 362/84 |
| 6,069,597 | A | 5/2000 | Hansen | 345/74 |
| 6,072,280 | A | 6/2000 | Allen | 315/185 S |
| 6,095,661 | A | 8/2000 | Lebens et al. | 362/184 |
| 6,097,352 | A | 8/2000 | Zavracky et al. | 345/7 |
| 6,132,072 | A | 10/2000 | Turnbull et al. | 362/494 |
| 6,135,604 | A | 10/2000 | Lin | 362/101 |
| 6,150,774 | A | 11/2000 | Mueller et al. | 315/291 |
| 6,166,496 | A | 12/2000 | Lys et al. | 315/316 |
| 6,175,201 | B1 | 1/2001 | Sid | 315/312 |
| 6,181,126 | B1 | 1/2001 | Havel | 324/115 |
| 6,183,086 | B1 | 2/2001 | Neubert | 351/221 |
| 6,184,628 | B1 | 2/2001 | Ruthenberg | 315/185 R |
| 6,196,471 | B1 | 3/2001 | Ruthenberg | 239/18 |
| 6,211,626 | B1 | 4/2001 | Lys et al. | 315/291 |
| 6,215,409 | B1 | 4/2001 | Blach | 340/815.4 |
| 6,250,774 | B1 | 6/2001 | Begemann et al. | 362/231 |
| 6,273,338 | B1 | 8/2001 | White | 235/462.42 |
| 6,292,901 | B1 | 9/2001 | Lys et al. | 713/300 |
| 6,310,590 | B1 | 10/2001 | Havel | 345/83 |
| 6,321,177 | B1 | 11/2001 | Ferrero et al. | 702/166 |
| 6,323,832 | B1 | 11/2001 | Nishizawa et al. | 345/83 |
| 6,340,868 | B1 | 1/2002 | Lys et al. | 315/185 S |
| 6,379,244 | B1 | 4/2002 | Sagawa et al. | 463/7 |
| 6,459,919 | B1 | 10/2002 | Lys et al. | 600/407 |
| 6,528,954 | B1 * | 3/2003 | Lys et al. | 315/291 |
| 6,577,080 | B2 * | 6/2003 | Lys et al. | 315/362 |
| 6,608,453 | B2 * | 8/2003 | Morgan et al. | 315/362 |
| 6,676,284 | B1 | 1/2004 | Wynne Willson | 362/555 |
| 6,717,376 | B2 * | 4/2004 | Lys et al. | 315/292 |
| 6,720,745 | B2 * | 4/2004 | Lys et al. | 315/312 |
| 6,788,011 | B2 * | 9/2004 | Mueller et al. | 315/292 |
| 6,806,659 | B1 * | 10/2004 | Mueller et al. | 315/295 |
| 6,812,653 | B2 * | 11/2004 | Bellivean | 315/294 |
| 6,897,624 | B2 * | 5/2005 | Lys et al. | 315/297 |
| 7,038,398 | B1 * | 5/2006 | Lys et al. | 315/291 |
| 2001/0033488 | A1 | 10/2001 | Chliwnyj et al. | 362/231 |
| 2002/0004423 | A1 | 1/2002 | Minami et al. | 463/38 |
| 2002/0047624 | A1 | 4/2002 | Stam et al. | 315/291 |
| 2002/0078221 | A1 * | 6/2002 | Blackwell et al. | 709/231 |
| 2002/0101197 | A1 | 8/2002 | Lys et al. | 315/291 |
| 2002/0152045 | A1 | 10/2002 | Dowling et al. | 702/107 |
| 2002/0158583 | A1 | 10/2002 | Lys et al. | 315/82 |
| 2003/0057884 | A1 * | 3/2003 | Dowling et al. | 315/291 |
| 2004/0252486 | A1 * | 12/2004 | Krause | 362/85 |
| 2005/0248299 | A1 * | 11/2005 | Chemel et al. | 315/312 |
| 2005/0275626 | A1 * | 12/2005 | Mueller et al. | 345/156 |

FOREIGN PATENT DOCUMENTS

| | | | |
|---|---|---|---|
| CA | 2 178 432 | A | 12/1996 |
| DE | 20018865 | U1 | 3/2001 |
| EP | 0495305 | A2 | 7/1992 |
| EP | 0534710 | B1 | 1/1996 |
| EP | 0752632 | A2 | 1/1997 |
| EP | 0752632 | A3 | 8/1997 |
| EP | 0823812 | A2 | 2/1998 |
| EP | 0903169 | A2 | 3/1999 |
| EP | 0935234 | A1 | 8/1999 |
| EP | 0942631 | A2 | 9/1999 |
| EP | 1020352 | A2 | 7/2000 |
| EP | 1113215 | A2 | 7/2001 |

| | | | |
|---|---|---|---|
| EP | 1130554 | A2 | 9/2001 |
| FR | 2 640 791 | A2 | 6/1990 |
| GB | 2045098 | A | 10/1980 |
| GB | 2135536 | A | 8/1984 |
| GB | 2176042 | A | 12/1986 |
| GB | 2 209 229 | A | 5/1989 |
| GB | 2 267 160 | A | 11/1993 |
| GB | 2327047 | A | 1/1999 |
| JP | 03045166 | A | 2/1991 |
| JP | 06043830 | A | 2/1994 |
| JP | 7-39120 | A | 7/1995 |
| JP | 8-106264 | A | 4/1996 |
| JP | 08007611 | A | 12/1996 |
| JP | 9 320766 | A | 12/1997 |
| WO | WO 89/05086 | A1 | 6/1989 |
| WO | WO 94/18809 | A1 | 8/1994 |
| WO | WO 95/13498 | A1 | 5/1995 |
| WO | WO 96/41098 | A1 | 12/1996 |
| WO | WO 02/40921 | A2 | 5/2002 |
| WO | WO 02/061328 | A1 | 8/2002 |

OTHER PUBLICATIONS

"LM117/LM317A/LM317 3-Terminal Adjustable Regulator", National Semiconductor Corporation, May 1997, pp. 1-20.

"DS96177 RS-485 / RS-422 Differential Bus Repeater", National Semiconductor Corporation, Feb. 1996, pp. 1-8.

"DS2003 / DA9667 / DS2004 High Current / Voltage Darlington Drivers", National Semiconductor Corporation, Dec. 1995, pp. 1-8.

"LM140A / LM140 / LM340A / LM7800C Series 3—Terminal Positive Regulators", National Semiconductor Corporation, Jan. 1995, pp. 1-14.

High End Systems, Inc., Trackspot User Manual, Aug. 1997, Excerpts (Cover, Title page, pp. ii through iii and 2-13 through 2-14).

Artistic License, AL4000 DMX512 Processors, Revision 3.4, Jun. 2000, Excerpts (Cover, pp. 7,92 through 102).

Artistic License, Miscellaneous Drawings (3 sheets) Jan. 12, 1995.

Artistic License, Miscellaneous Documents (2 sheets Feb. 1995 and Apr. 1996).

Newnes's Dictionary of Electronics, Fourth Edition, S.W. Amos, et al. Preface to First Edition, pp. 278-279.

"http://www.luminus.ex/projects/chaser", (Nov. 13, 2000), pp. 1-16.

Website Reference: Lamps & Gear Site, Announcing A New Industry Standard For Addressable Lighting Control Systems, 3 pages.

* cited by examiner

500

| 502 LIGHT SYSTEM | 504 TIME | 508 POSITION | 510 LIT POSITION | 512 COLOR RANGE | 514 INTENSITY | 518 OTHER SYS. | 520 POSITION |
|---|---|---|---|---|---|---|---|
| LS001 | T1 | (1,3,7) | POLY001 | 0–16000 | 0–100 | | |
| LS001 | T2 | (1,3,7) | POLY001 | 0–16000 | | | |
| LS001 | T3 | (1,3,7) | POLY002 | 0–16000 | | | |
| LS002 | T1 | (0,0,0) | POLY003 | 0–16000 | | | |
| LS002 | T2 | (0,0,0) | POLY004 | 0–16000 | | | |
| LS002 | T3 | (0,0,0) | POLY005 | 0–16000 | | | |
| | | | | | | | |
| | | | | | | | |
| | | | | | | | |
| | | | | | | | |
| | | | | | | | |
| LS00N | TN | | | | | | |

FIG. 5

SYSTEMS AND METHODS OF GENERATING CONTROL SIGNALS

CROSS REFERENCE TO RELATED APPLICATIONS

This patent application claims the benefit under 35 U.S.C. §119(e) of the following U.S. Provisional applications:

Ser. No. 60/296,344, filed Jun. 6, 2001, entitled "Systems and Methods of Generating Control Signals";

Ser. No. 60/301,692, filed Jun. 28, 2001, entitled "Systems and Methods for Networking LED Lighting Systems";

Ser. No. 60/328,867, filed Oct. 12, 2001, entitled "Systems and Methods for Networking LED Lighting Systems;" and Ser. No. 60/341,476, filed Oct. 30, 2001, entitled "Systems and Methods for LED Lighting."

This application also claims the benefit under 35 U.S.C. §120 as a continuation-in-part (CIP) of U.S. Non-provisional application Ser. No. 09/971,367, filed Oct. 4, 2001, entitled "Multicolored LED Lighting Method and Apparatus," now U.S. Pat. No. 6,788,011, which is a continuation of U.S. Non-provisional application Ser. No. 09/669,121, filed Sep. 25, 2000, entitled "Multicolored LED Lighting Method and Apparatus," now U.S. Pat. No. 6,806,659, which is a continuation of U.S. Ser. No. 09/425,770, filed Oct. 22, 1999, now U.S. Pat. No. 6,150,774, which is a continuation of U.S. Ser. No. 08/920,156, filed Aug. 26, 1997, now U.S. Pat. No. 6,016,038.

This application also claims the benefit under 35 U.S.C. §120 as a continuation-in-part (CIP) of the following U.S. Non-provisional applications:

Ser. No. 09/870,193, filed May 30, 2001, entitled "Methods and Apparatus for Controlling Devices in a Networked Lighting System," now U.S. Pat. No. 6,608,453;

Ser. No. 09/215,624, filed Dec. 17, 1998, entitled "Smart Light Bulb," now U.S. Pat. No. 6,528,954;

Ser. No. 09/213,607, filed Dec. 17, 1998, entitled "Systems and Methods for Sensor-Responsive Illumination," now abandoned;

Ser. No. 09/213,189, filed Dec. 17, 1998, entitled "Precision Illumination Methods and Systems," now U.S. Pat. No. 6,459,919;

Ser. No. 09/213,581, filed Dec. 17, 1998, entitled "Kinetic Illumination Systems and Methods," now U.S. Pat. No. 7,038,398;

Ser. No. 09/213,540, filed Dec. 17, 1998, entitled "Data Delivery Track," now U.S. Pat. No. 6,720,745;

Ser. No. 09/333,739, filed Jun. 15, 1999, entitled "Diffuse Illumination Systems and Methods;"

Ser. No. 09/815,418, filed Mar. 22, 2001, entitled "Lighting Entertainment System," now U.S. Pat. No. 6,577,080, which is a continuation of U.S. Ser. No. 09/213,548, filed Dec. 17, 1998, now U.S. Pat. No. 6,166,496;

Ser. No. 10/045,604, filed Oct. 23, 2001, entitled "Systems and Methods for Digital Entertainment;"

Ser. No. 09/989,095, filed Nov. 20, 2001, entitled "Automotive Information Systems," now U.S. Pat. No. 6,717,376;

Ser. No. 09/989,747, filed Nov. 20, 2001, entitled "Packaged Information Systems," now U.S. Pat. No. 6,897,624; and Ser. No. 09/989,677, filed Nov. 20, 2001, entitles entitled "Information Systems."

Ser. No. 09/215,624 claims the benefit, under 35 U.S.C. 119(e), of the following five U.S. Provisional applications:

Ser. No. 60/071,281, filed Dec. 17, 1997, entitled "Digitally Controlled Light Emitting Diodes Systems and Methods;"

Ser. No. 60/068,792, filed Dec. 24, 1997, entitled "Multi-Color Intelligent Lighting;"

Ser. No. 60/078,861, filed Mar. 20, 1998, entitled "Digital Lighting Systems;"

Ser. No. 60/079,285, filed Mar. 25, 1998, entitled "System and Method for Controlled Illumination;" and Ser. No. 60/090,920, filed Jun. 26, 1998, entitled "Methods for Software Driven Generation of Multiple Simultaneous High Speed Pulse Width Modulated Signals."

Ser. No. 10/045,604 claims the benefit, under 35 U.S.C. §119(e), of the following two U.S. Provisional applications:

Ser. No. 60/277,911, filed Mar. 22, 2001, entitled "Systems and Methods for Digital Entertainment;" and Ser. No. 60/242,484, filed Oct. 23, 2000, entitled, "Systems and Methods for Digital Entertainment,"

Ser. No. 09/989,677 claims the benefit, under 35 U.S.C. §119(e), of the following five U.S. Provisional applications:

Ser. No. 60/252,004, filed Nov. 20, 2000, entitled, "Intelligent Indicators;"

Ser. No. 60/262,022, filed Jan. 16, 2001, entitled, "Color Changing LCD Screens;"

Ser. No. 60/262,153, filed Jan. 17, 2001, entitled, "Information Systems;"

Ser. No. 60/268,259, filed Feb. 13, 2001, entitled, "LED Based Lighting Systems for Vehicals;" and Ser. No. 60/296,219, filed Jun. 6, 2001, entitled, "Systems and Methods for Displaying Information."

Each of the foregoing applications is hereby incorporated herein by reference.

BACKGROUND OF THE INVENTION

Networked lighting control has become increasingly popular due to the variety of illumination conditions that can be created. Color Kinetics Incorporated offers a full line of networked lighting systems as well as controllers and light-show authoring tools. Control signals for lighting systems are generally generated and communicated through a network to a plurality of lighting systems. Several lighting systems may be arranged in a lighting network and information pertaining to each lighting device may be communicated to through the network. Each lighting device or system may have a unique identifier or address such that it only reads and react to information directed at its particular address.

There are several methods used for generating networked lighting control signals. A control-signal generating tool can offer a graphical user interface where lighting shows and sequences can be authored. The user can set up series of addressed lighting systems and then create a lighting control signal that is directed to the individually addressed lighting systems. Such an authoring system can be used to generate coordinated effects between lighting systems or within groups of lighting systems. One particularly popular lighting effect that would be difficult to program without an authoring system is chasing a rainbow of colors down a corridor.

To produce a coordinated lighting effect a user must conventionally have knowledge of where the lighting systems reside as well as knowing the particular addresses each of the lighting systems. It remains difficult to program lighting effects that are designed to move through an area other than in a line or within a group of lighting systems. It would be useful to provide a system that allowed a user to generate and communicate lighting control signals based on the desired effect in an area.

SUMMARY OF THE INVENTION

Provided herein are methods and systems for generating a control signal for a light system. The methods and systems include facilities for providing a light management facility for mapping the positions of a plurality of light systems, generating a map file that maps the positions of a plurality of light systems, generating an effect using a computer application, associating characteristics of the light systems with code for the computer application, and generating a lighting control signal to control the light systems.

Provided herein are methods and systems for controlling a light system. The methods and systems may include providing graphical information; associating a plurality of addressable light systems with locations in an environment; and converting the graphical information to control signals capable of controlling the light systems to illuminate the environment in correspondence to the graphical information.

Provided herein are methods and systems for controlling a light system. The methods and systems may include accessing a set of information for producing a graphic; associating a plurality of addressable light systems with locations in an environment; and applying an algorithm to the graphical information to convert the graphical information to control signals capable of controlling the light systems to create an effect in the environment in correspondence to the graphical information.

Provided herein are methods and systems for automatically associating a plurality of light systems with positions in an environment. The methods and systems may include accessing an imaging device for capturing an image of a light system; commanding each of a plurality of light systems to turn on in a predetermined sequence; capturing an image during the "on" time for each of a plurality of light systems; and calculating the position of the light system in the environment based on the position of the lighting system in the image.

Provided herein are methods and systems for generating a lighting effect in an environment. The methods and systems may include generating an image using a non-lighting system; associating a plurality of light systems with positions in an environment; and using the association of the light systems and positions to convert the image into control signals for a light system, wherein the light system generates an effect that corresponds to the image.

Provided herein are methods and systems for generating a control signal for a light system. The methods and systems may include providing a light management facility for mapping the positions of a plurality of light systems; using the light management facility to generate map files that map the positions of a plurality of light systems; using an animation facility to generate a plurality of graphics files; associating the positions of the light systems in the map files with data in the graphics files; and generating a lighting control signal to control the light systems in association with the graphics files.

Provided herein are methods and systems for controlling a lighting system. The methods and systems may include obtaining a lighting control signal for a plurality of light systems in an environment; obtaining a graphics signal from a computer; and modifying the lighting control signal in response to the content of the graphics signal.

The present invention eliminates many of the problems associated with the prior art. An embodiment of the invention is a system for generating control signals. The system may allow a user to generate an image, representation of an image, algorithm or other effect information. The effect information may then be converted to lighting control signals to be saved or communicated to a networked lighting system. An embodiment of the invention may enable the authoring, generation and communication of control signals such that an effect is generated in a space or area.

In an embodiment, control signals capable of controlling a lighting system, lighting network, light, LED, LED lighting system, audio system, surround sound system, fog machine, rain machine, electromechanical system or other system may be generated.

A system according to the principles of the invention may include the generation of image information and conversion of the image information to control signals capable of controlling a networked lighting system. In an embodiment, configuration information may be generated identifying a plurality of addressable lighting systems with locations within an area or space. In an embodiment, configuration information may be generated associated lighted surfaces with lighting systems. In an embodiment, control signals may be communicated to a lighting network comprising a plurality of addressed lighting systems. In an embodiment, sound or other effects may be coordinated with lighting control signals.

BRIEF DESCRIPTION OF THE FIGURES

The following figures depict certain illustrative embodiments of the invention in which like reference numerals refer to like elements. These depicted embodiments are to be understood as illustrative of the invention and not as limiting in any way.

FIG. 5 illustrates a configuration file for data relating to light systems in an environment.

DETAILED DESCRIPTION OF THE PREFERRED EMBODIMENT(S)

The description below pertains to several illustrative embodiments of the invention. Although many variations of the invention may be envisioned by one skilled in the art, such variations and improvements are intended to fall within the compass of this disclosure. Thus, the scope of the invention is not to be limited in any way by the disclosure below.

An embodiment of this invention relates to systems and methods for generating control signals. The control signals may be used to control a lighting system, lighting network, light, LED, LED lighting system, audio system, surround sound system, fog machine, rain machine, electromechanical system or other systems. Lighting systems like those described in U.S. Pat. Nos. 6,016,038, 6,150,774, and 6,166,496 illustrate some different types of lighting systems where control signals may be used.

To provide an overall understanding of the invention, certain illustrative embodiments will now be described, including various applications for programmable lights and lighting systems, including LED-based systems. However, it will be understood by those of ordinary skill in the art that the methods and systems described herein may be suitably adapted to other environments where programmable lighting may be desired, and embodiments described herein may be suitable to non-LED based lighting. One of skill in the art would also understand that the embodiments described below could be used in conjunction with any type of computer software that need not be an authoring tool for lighting control systems, but of various other types of computer application. Further, the user need not be operating a computer, but could be operating any type of computing device, capable of running a software application that is providing that user with information.

In certain computer applications, there is typically a display screen (which could be a personal computer screen, television screen, laptop screen, handheld, gameboy screen, computer monitor, flat screen display, LCD display, PDA screen, or other display) that represents a virtual environment of some type. There is also typically a user in a real world environment that surrounds the display screen. The present invention relates, among other things, to using a computer application in a virtual environment to generate control signals for systems, such as lighting systems, that are located in real world environments.

Figure 1:
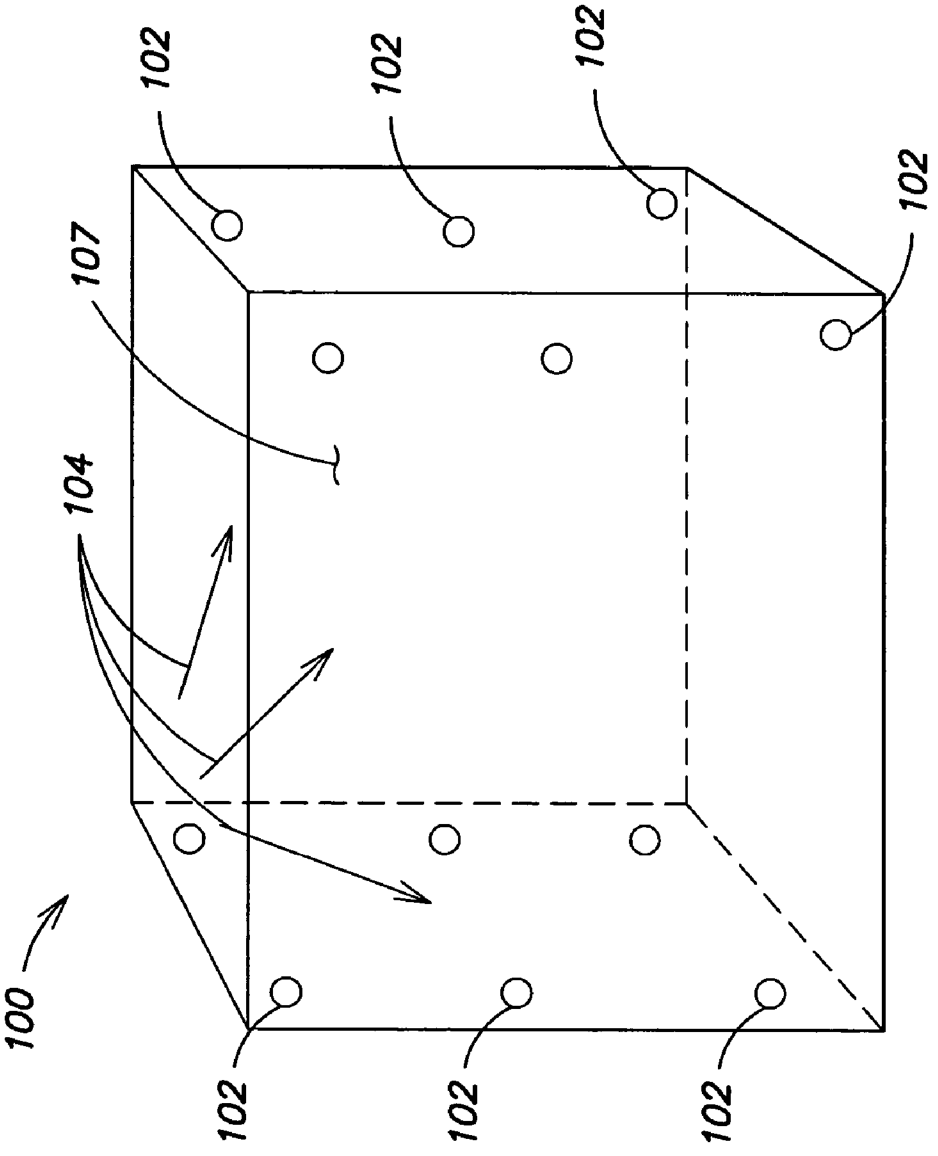
FIG. 1 is a representation of an environment in which a plurality of light systems are disposed.

Referring to FIG. 1, in an embodiment of the invention described herein, an environment 100 includes one or more light systems 102. As used herein "light systems" should be understood where context is appropriate to comprise all light systems, including LED systems, as well as incandescent sources, including filament lamps, pyro-luminescent sources, such as flames, candle-luminescent sources, such as gas mantles and carbon arc radiation sources, as well as photo-luminescent sources, including gaseous discharges, fluorescent sources, phosphorescence sources, lasers, electro-luminescent sources, such as electro-luminescent lamps, light emitting diodes, and cathode luminescent sources using electronic satiation, as well as miscellaneous luminescent sources including galvano-luminescent sources, crystallo-luminescent sources, kine-luminescent sources, thermo-luminescent sources, triboluminescent sources, sonoluminescent sources, and radioluminescent sources. Light systems 102 may also include luminescent polymers capable of producing colors, such as primary colors. In one preferred embodiment, the light systems 102 are LED-based light systems. In one preferred embodiment, the light systems 102 are capable of mixing two colors of light, which might be red, green, blue, white, amber, or other colors of light. In one embodiment, the colors of lights may be different colors of white light, i.e., white lights of different color temperatures.

As used herein, the term "LED" means any system that is capable of receiving an electrical signal and producing a color of light in response to the signal. Thus, the term "LED" should be understood to include light emitting diodes of all types, light emitting polymers, semiconductor dies that produce light in response to current, organic LEDs, electro-luminescent strips, and other such systems. In an embodiment, an "LED" may refer to a single light emitting diode having multiple semiconductor dies that are individually controlled. It should also be understood that the term "LED" does not restrict the package type of the LED. The term "LED" includes packaged LEDs, non-packaged LEDs, surface mount LEDs, chip on board LEDs and LEDs of all other configurations. The term "LED" also includes LEDs packaged or associated with phosphor wherein the phosphor may convert energy from the LED to a different wavelength. An LED system is one type of illumination source.

The term "illuminate" should be understood to refer to the production of a frequency of radiation by an illumination source. The terms "light" and "color" should be understood where context is appropriate to refer to any frequency of radiation within a spectrum; that is, a "color" of "light," as used herein, should be understood to encompass a frequency or combination of frequencies not only of the visible spectrum, including white light, but also frequencies in the infrared and ultraviolet areas of the spectrum, and in other areas of the electromagnetic spectrum.

Figure 2:
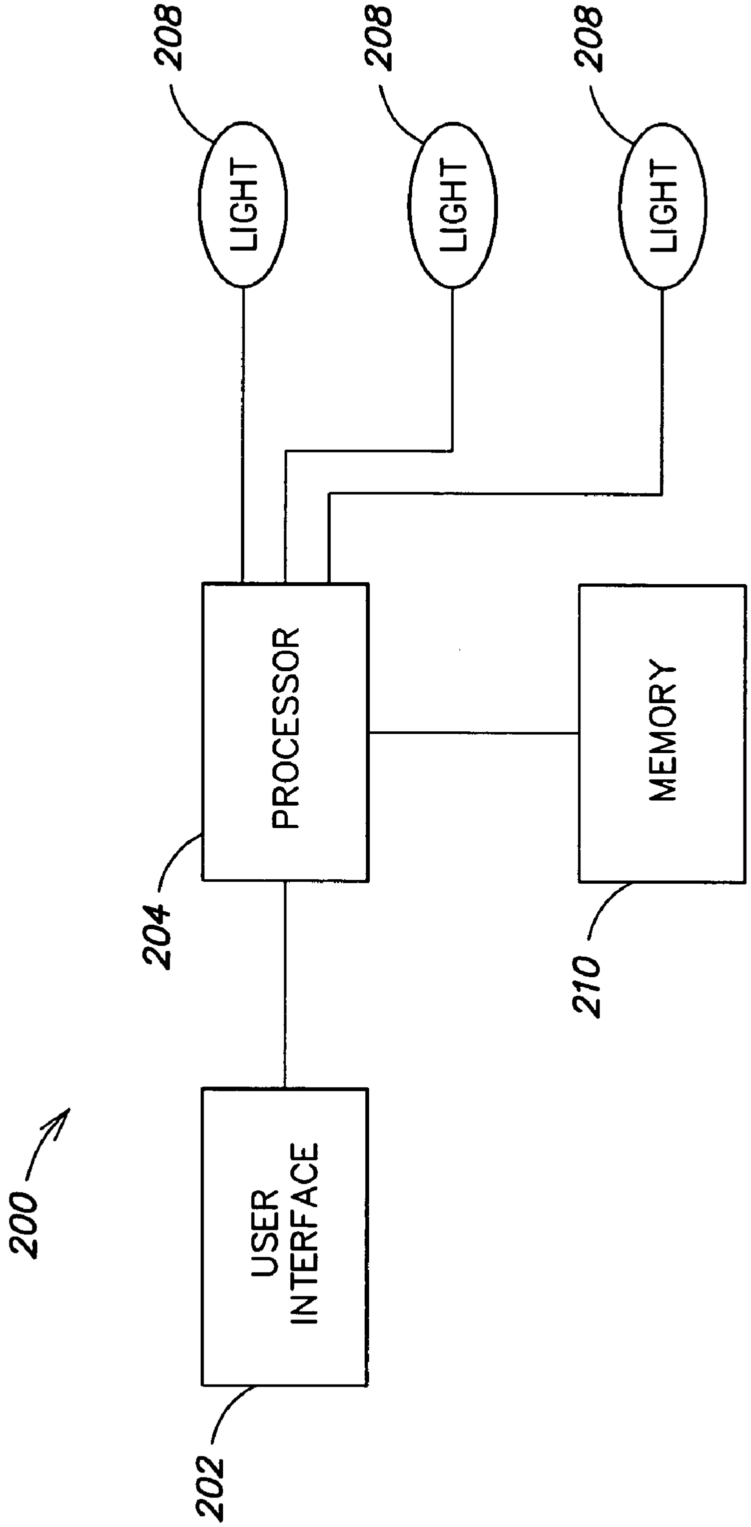
FIG. 2 is a schematic diagram showing control of a plurality of lights using a group of control elements.

FIG. 2 is a block diagram illustrating one embodiment of a lighting system 200. A processor 204 is associated several lights 208. The processor sends control signals to the lights 208. Such a system may optionally have one or more intermediate components between the processor and the lights 208, such as one or more controllers, transistors, or the like.

As used herein, the term processor may refer to any system for processing electronic signals. A processor may include a microprocessor, microcontroller, programmable digital signal processor, other programmable device, a controller, addressable controller, microprocessor, microcontroller, addressable microprocessor, computer, programmable processor, programmable controller, dedicated processor, dedicated controller, integrated circuit, control circuit or other processor. A processor may also, or instead, include an application specific integrated circuit, a programmable gate array, programmable array logic, a programmable logic device, a digital signal processor, an analog-to-digital converter, a digital-to-analog converter, or any other device that may be configured to process electronic signals. In addition, a processor may include discrete circuitry such as passive or active analog components including resistors, capacitors, inductors, transistors, operational amplifiers, and so forth, as well as discrete digital components such as logic components, shift registers, latches, or any other separately packaged chip or other component for realizing a digital function. Any combination of the above circuits and components, whether packaged discretely, as a chip, as a chipset, or as a die, may be suitably adapted to use as a processor as described herein. It will further be appreciated that the term processor may apply to an integrated system, such as a personal computer, network server, or other system that may operate autonomously or in response to commands to process electronic signals such as those described herein. Where a processor includes a programmable device such as the microprocessor or microcontroller mentioned above, the processor may further include computer executable code that controls operation of the programmable device. In an embodiment, the processor 204 is a Microchip PIC processor 12C672 and the lights 208 are LEDs, such as red, green and blue LEDs.

The processor 204 may optionally include or be used in association with various other components and control elements (not shown), such as a pulse width modulator, pulse amplitude modulator, pulse displacement modulator, resistor ladder, current source, voltage source, voltage ladder, switch, transistor, voltage controller, or other controller. The control elements and processor 204 can control current, voltage and/or power through the lights 208.

In an embodiment, several LEDs with different spectral output may be used as lights 208. Each of these colors may be driven through separate channels of control. The processor 204 and controller may be incorporated into one device. This device may power capabilities to drive several LEDs in a string or it may only be able to support one or a few LEDs directly. The processor 204 and controller may also be separate devices. By controlling the LEDs independently, color mixing can be achieved for the creation of lighting effects.

In an embodiment, memory 210 may also be provided. The memory 210 is capable of storing algorithms, tables, or values associated with the control signals. The memory 210 may store programs for controlling the processor 204, other components, and lights 208. The memory 210 may be memory, read-only memory, programmable memory, programmable read-only memory, electronically erasable programmable read-only memory, random access memory, dynamic random access memory, double data rate random access memory, Rambus direct random access memory, flash memory, or any other volatile or non-volatile memory for storing program instructions, program data, address information, and program output or other intermediate or final results.

A program, for example, may store control signals to operate several different colored lights 208. A user interface 202 may also optionally be associated with the processor 204. The user interface 202 may be used to select a program from memory, modify a program from memory, modify a program parameter from memory, select an external signal or provide other user interface solutions. Several methods of color mixing and pulse width modulation control are disclosed in U.S. Pat. No. 6,016,038 "Multicolored LED Lighting Method and Apparatus," the entire disclosure of which is incorporated by reference herein. The processor 204 can also be addressable to receive programming signals addressed to it. For example, a processor 204 can receive a stream of data (or lighting control signals) that includes data elements for multiple similar processors or other devices, and the processor 204 can extract from the stream the appropriate data elements that are addressed to it. In an embodiment, the user interface can include an authoring system for generating a lighting control signal, such as described in more detail below.

There have been significant advances in the control of LEDs. U.S. patents in the field of LED control include U.S. Pat. Nos. 6,016,038, 6,150,774, and 6,166,496. U.S. patent application Ser. No. 09/716,819 for "Systems and Methods for Generating and Modulating Illumination Conditions" also describes, among other things, systems and controls. The entire disclosure of all these documents is herein incorporated by reference.

In embodiments of the invention, the lighting system may be used to illuminate an environment. On such environment 100 is shown in FIG. 1. The environment has at least one light system 102 mounted therein, and in a preferred embodiment may have multiple light systems 102 therein. The light system 102 may be a controllable light system 102, such as described above in connection with FIG. 2, with lights 208 that illuminate portions of the environment 100.

Generally the light systems 102 can be mounted in a manner that a viewer in the environment 100 can see either the illumination projected by a light system 102 directly, or the viewer sees the illumination indirectly, such as after the illumination bounces off a surface, or through a lens, filter, optic, housing, screen, or similar element that is designed to reflect, diffuse, refract, diffract, or otherwise affect the illumination from the light system 102.

The light systems 102 in combination comprise a lighting or illumination system. The lighting system may be in communication with a control system or other user interface 202, such as a computer, by any manner known to one of skill in the art which can include, but is not limited to: wired connections, cable connections, infrared (IR) connections, radio frequency (RF) connections, any other type of connection, or any combination of the above.

Various control systems can be used to generate lighting control signals, as described below. In one embodiment, control may be passed to the lighting system via a video-to-DMX device, which provides a simple way of generating the lighting signal. Such a device may have a video-in port and a pass-through video-out port. The device may also have a lighting signal port where the DMX, or other protocol data, is communicated to the lights in the room. The device may apply an algorithm to the received video signal (e.g. average, average of a given section or time period, max, min) and then generate a lighting signal corresponding to the algorithm output. For example, the device may average the signal over the period of one second with a resultant value equal to blue light. The device may then generate blue light signals and communicate them to the lighting system. In an embodiment, a simple system would communicate the same averaged signal to all of the lights in the room, but a variant would be to communicate the average of a portion of the signal to one portion of the room. There are many ways of partitioning the video signal, and algorithms could be applied to the various sections of the light system, thus providing different inputs based on the same video signal.

Referring still to FIG. 1, the environment 100 may include a surface 107 that is lit by one or more lighting systems 102. In the depicted embodiment the surface 107 comprises a wall or other surface upon which light could be reflected. In another embodiment, the surface could be designed to absorb and retransmit light, possibly at a different frequency. For instance the surface 107 could be a screen coated with a phosphor where illumination of a particular color could be projected on the screen and the screen could convert the color of the illumination and provide a different color of illumination to a viewer in the environment 100. For instance the projected illumination could primarily be in the blue, violet or ultraviolet range while the transmitted light is more of a white. In embodiments, the surface 107 may also include one or more colors, figures, lines, designs, figures, pictures, photographs, textures, shapes or other visual or graphical elements that can be illuminated by the lighting system. The elements on the surface can be created by textures, materials, coatings, painting, dyes, pigments, coverings, fabrics, or other methods or mechanisms for rendering graphical or visual effects. In embodiments, changing the illumination from the lighting system may create visual effects. For example, a picture on the surface 107 may fade or disappear, or become more apparent or reappear, based on the color of the light from the lighting system that is rendered on the surface 107. Thus, effects can be created on the surface 107 not only by shining light on a plain surface, but also through the interaction of light with the visual or graphical elements on the surface.

In certain preferred embodiments, the light systems 102 are networked lighting systems where the lighting control signals are packaged into packets of addressed information. The addressed information may then be communicated to the lighting systems in the lighting network. Each of the lighting systems may then respond to the control signals that are addressed to the particular lighting system. This is an extremely useful arrangement for generating and coordinating lighting effects in across several lighting systems. Embodiments of U.S. patent application Ser. No. 09/616,214 "Systems and Methods for Authoring Lighting Sequences" describe systems and methods for generating system control signals and is herby incorporated by reference herein.

A lighting system, or other system according to the principles of the present invention, may be associated with an addressable controller. The addressable controller may be arranged to "listen" to network information until it "hears" its address. Once the systems address is identified, the system may read and respond to the information in a data packet that is assigned to the address. For example, a lighting system may include an addressable controller. The addressable controller may also include an alterable address and a user may set the address of the system. The lighting system may be connected to a network where network information is communicated. The network may be used to communicate information to many controlled systems such as a plurality of lighting systems for example. In such an arrangement, each of the plurality of lighting systems may be receiving information pertaining to more than one lighting system. The information may be in the form of a bit stream where information for a first addressed lighting system is followed by information directed at a second addressed lighting system. An example of such a lighting system can be found in U.S. Pat. No. 6,016,038, which is herby incorporated by reference herein.

Figure 11:
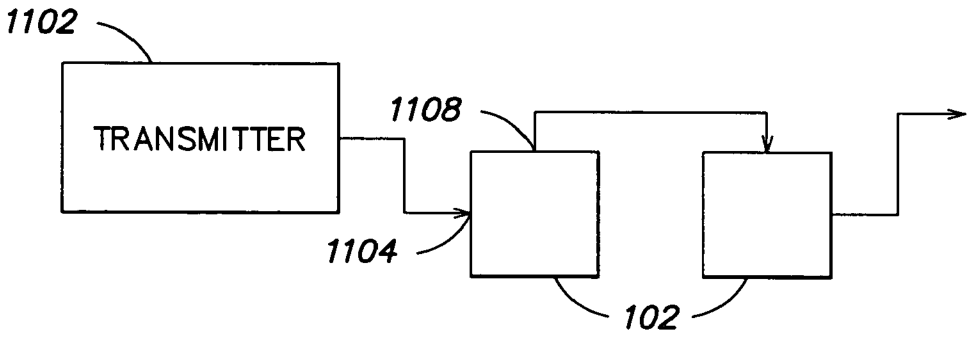
FIG. 11 is a schematic diagram depicting light systems that transmit data that is generated by a network transmitter.

Referring to FIG. 11, in one embodiment of a networked lighting system according to the principles of the invention, a network transmitter 1102 communicates network information to the light systems 102. In such an embodiment, the light systems 102 can include an input port 1104 and an export port 1108. The network information may be communicated to the first light system 102 and the first light system 102 may read the information that is addressed to it and pass the remaining portion of the information on to the next light system 102. A person with ordinary skill in the art would appreciate that there are other network topologies that are encompassed by a system according to the principles of the present invention.

In an embodiment, the light system 102 is placed in a real world environment 100. The real world environment 100 could be a room. The lighting system could be arranged, for example, to light the walls, ceiling, floor or other sections or objects in a room, or particular surfaces 107 of the room. The lighting system may include several addressable light systems 102 with individual addresses. The illumination can be projected so as to be visible to a viewer in the room either directly or indirectly. That is a light 208 of a light system 102 could shine so that the light is projected to the viewer without reflection, or could be reflected, refracted, absorbed and reemitted, or in any other manner indirectly presented to the viewer.

Figure 3:
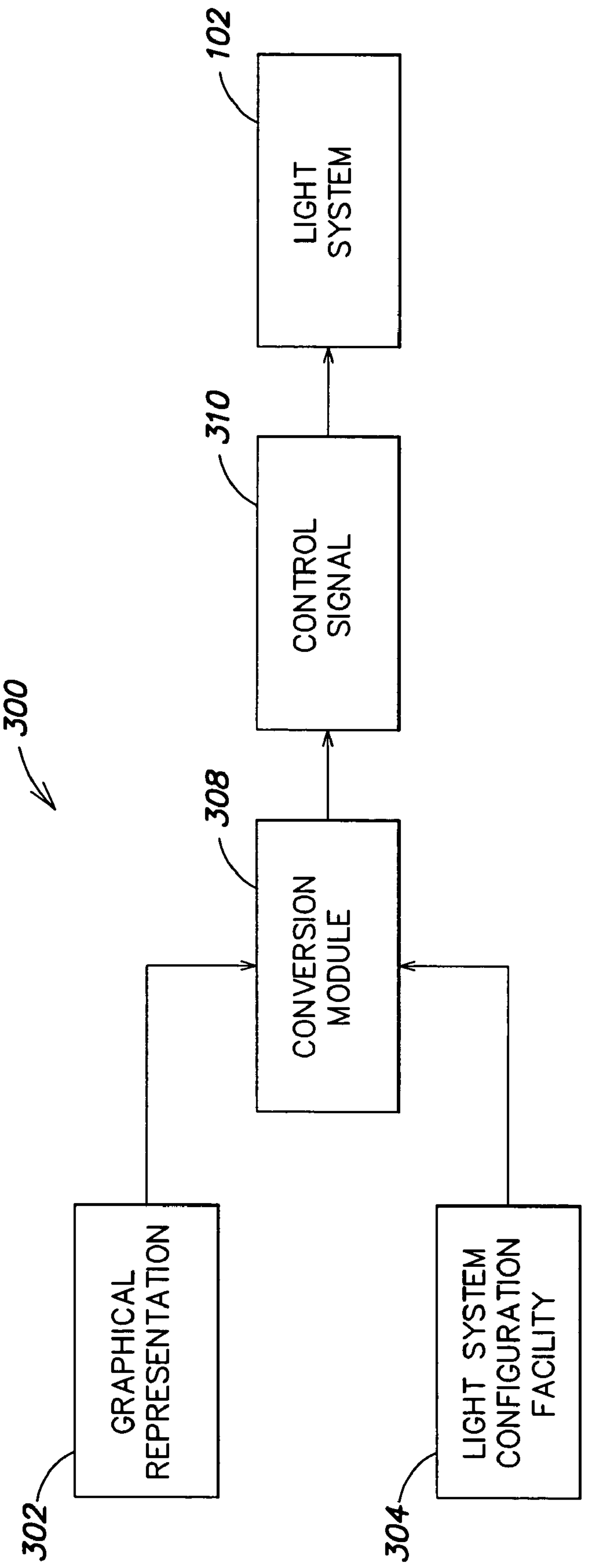
FIG. 3 is a schematic diagram showing elements for generating a lighting control signal using a configuration facility and a graphical representation facility.

An embodiment of the present invention describes a method 300 for generating control signals as illustrated in the block diagram in FIG. 3. The method may involve providing or generating an image or representation of an image, i.e., a graphical representation 302. The graphical representation may be a static image such as a drawing, photograph, generated image, or image that is or appears to be static. The static image may include images displayed on a computer screen or other screen even though the image is continually being refreshed on the screen. The static image may also be a hard copy of an image.

Providing a graphical representation 302 may also involve generating an image or representation of an image. For example, a processor may be used to execute software to generate the graphical representation 302. Again, the image that is generated may be or appear to be static or the image may be dynamic. An example of software used to generate a dynamic image is Flash 5 computer software offered by Macromedia, Incorporated. Flash 5 is a widely used computer program to generate graphics, images and animations. Other useful products used to generate images include, for example, Adobe Illustrator, Adobe Photoshop, and Adobe LiveMotion. There are many other programs that can be used to generate both static and dynamic images. For example, Microsoft Corporation makes a computer program Paint. This software is used to generate images on a screen in a bit map format. Other software programs may be used to generate images in bitmaps, vector coordinates, or other techniques. There are also many programs that render graphics in three dimensions or more. Direct X libraries, from Microsoft Corporation, for example generate images in three-dimensional space. The output of any of the foregoing software programs or similar programs can serve as the graphical representation 302.

In embodiments the graphical representation 302 may be generated using software executed on a processor but the graphical representation 302 may never be displayed on a screen. In an embodiment, an algorithm may generate an image or representation thereof, such as an explosion in a room for example. The explosion function may generate an image and this image may be used to generate control signals as described herein with or without actually displaying the image on a screen. The image may be displayed through a lighting network for example without ever being displayed on a screen.

In an embodiment, generating or representing an image may be accomplished through a program that is executed on a processor. In an embodiment, the purpose of generating the image or representation of the image may be to provide information defined in a space. For example, the generation of an image may define how a lighting effect travels through a room. The lighting effect may represent an explosion, for example. The representation may initiate bright white light in the corner of a room and the light may travel away from this corner of the room at a velocity (with speed and direction) and the color of the light may change as the propagation of the effect continues. An illustration of an environment 100 showing vectors 104 demonstrating the velocity of certain lighting effects is illustrated in FIG. 1. In an embodiment, an image generator may generate a function or algorithm. The function or algorithm may represent an event such as an explosion, lighting strike, headlights, train passing through a room, bullet shot through a room, light moving through a room, sunrise across a room, or other event. The function or algorithm may represent an image such as lights swirling in a room, balls of light bouncing in a room, sounds bouncing in a room, or other images. The function or algorithm may also represent randomly generated effects or other effects.

Referring again to FIG. 3, a light system configuration facility 304 may accomplish further steps for the methods and systems described herein. The light system configuration facility may generate a system configuration file, configuration data or other configuration information for a lighting system, such as the one depicted in connection with FIG. 1.

The light system configuration facility can represent or correlate a system, such as a light system 102, sound system or other system as described herein with a position or positions in the environment 100. For example, an LED light system 102 may be correlated with a position within a room. In an embodiment, the location of a lighted surface 107 may also be determined for inclusion into the configuration file. The position of the lighted surface may also be associated with a light system 102. In embodiments, the lighted surface 107 may be the desired parameter while the light system 102 that generates the light to illuminate the surface is also important. Lighting control signals may be communicated to a light system 102 when a surface is scheduled to be lit by the light system 102. For example, control signals may be communicated to a lighting system when a generated image calls for a particular section of a room to change in hue, saturation or brightness. In this situation, the control signals may be used to control the lighting system such that the lighted surface 107 is illuminated at the proper time. The lighted surface 107 may be located on a wall but the light system 102 designed to project light onto the surface 107 may be located on the ceiling. The configuration information could be arranged to initiate the light system 102 to activate or change when the surface 107 is to be lit.

Referring still to FIG. 3, the graphical representation 302 and the configuration information from the light system configuration facility 304 can be delivered to a conversion module 308, which associates position information from the configuration facility with information from the graphical representation and converts the information into a control signal, such as a control signal 310 for a light system 102. Then the conversion module can communicate the control signal, such as to the light system 102. In embodiments the conversion module maps positions in the graphical representation to positions of light systems 102 in the environment, as stored in a configuration file for the environment (as described below). The mapping might be a one-to-one mapping of pixels or groups of pixels in the graphical representation to light systems 102 or groups of light systems 102 in the environment 100. It could be a mapping of pixels in the graphical representation to surfaces 107, polygons, or objects in the environment that are lit by light systems 102. It could be a mapping of vector coordinate information, a wave function, or algorithm to positions of light systems 102. Many different mapping relations can be envisioned and are encompassed herein.

Figure 4:
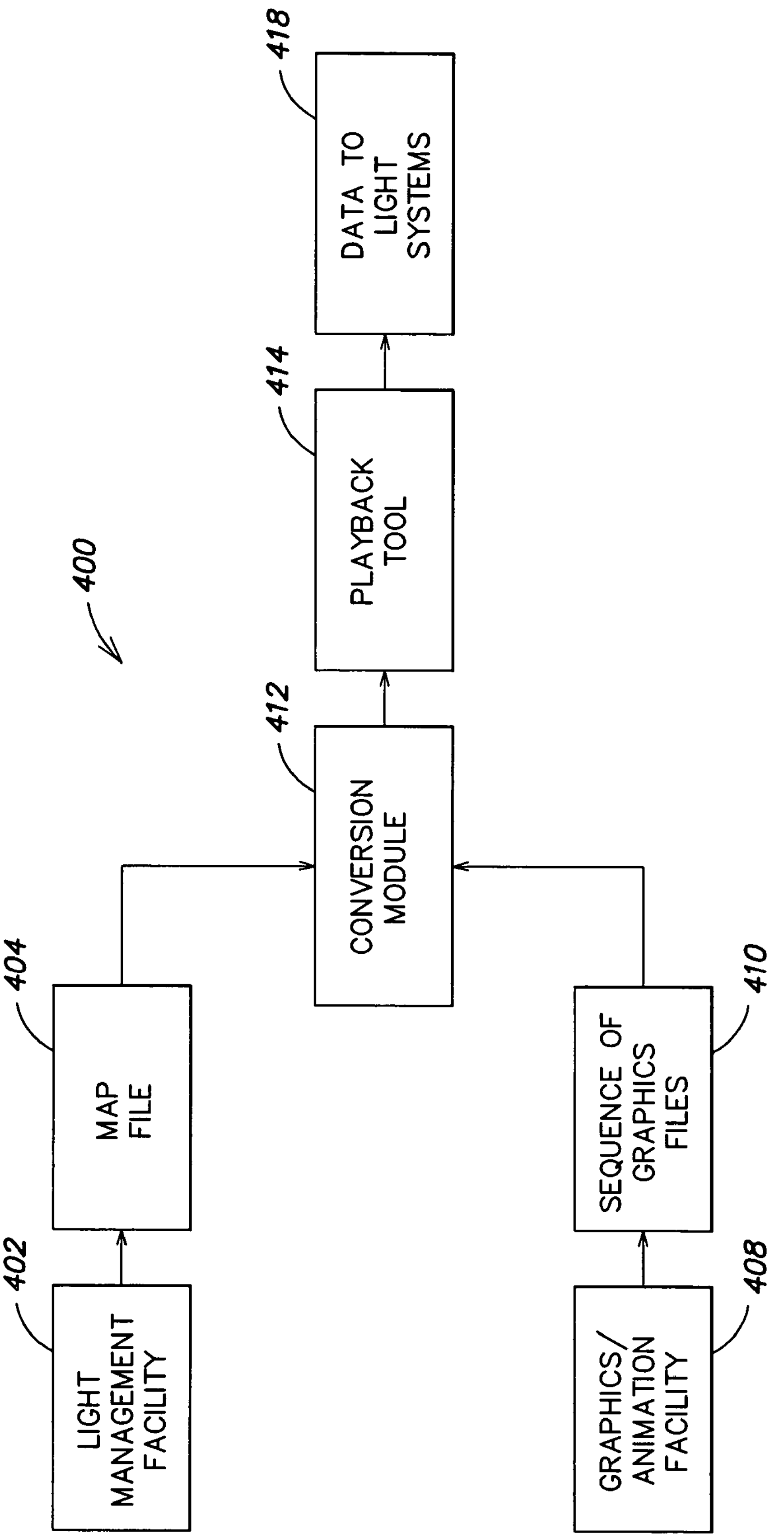
FIG. 4 is a schematic diagram showing elements for generating a lighting control signal from an animation facility and light management facility.

Referring to FIG. 4, another embodiment of a block diagram for a method and system 400 for generating a control signal is depicted. A light management facility 402 is used to generate a map file 404 that maps light systems 102 to positions in an environment, to surfaces that are lit by the light systems, and the like. An animation facility 408 generates a sequence of graphics files 410 or an animation effect. A conversion module 412 relates the information in the map file 404 for the light systems 102 to the graphical information in the graphics files. For example, color information in the graphics file may be used to convert to a color control signal for a light system to generate a similar color. Pixel information for the graphics file may be converted to address information for light systems which will correspond to the pixels in question. In embodiments, the conversion module 412 includes a lookup table for converting particular graphics file information into particular lighting control signals, based on the content of a configuration file for the lighting system and conversion algorithms appropriate for the animation facility in question. The converted information can be sent to a playback tool 414, which may in turn play the animation and deliver control signals 418 to light systems 102 in an environment.

Referring to FIG. 5, an embodiment of a configuration file 500 is depicted, showing certain elements of configuration information that can be stored for a light system 102 or other system. Thus, the configuration file 500 can store an identifier 502 for each light system 102, as well as the position 508 of that light system in a desired coordinate or mapping system for the environment 100 (which may be (x,y,z) coordinates, polar coordinates, (x,y) coordinates, or the like). The position 508 and other information may be time-dependent, so the configuration file 500 can include an element of time 504. The configuration file 500 can also store information about the position 510 that is lit by the light system 102. That information can consist of a set of coordinates, or it may be an identified surface, polygon, object, or other item in the environment. The configuration file 500 can also store information about the available degrees of freedom for use of the light system 102, such as available colors in a color range 512, available intensities in an intensity range 514, or the like. The configuration file 500 can also include information about other systems 518 in the environment that are controlled by the control systems disclosed herein, information about the characteristics of surfaces 107 in the environment, and the like. Thus, the configuration file 500 can map a set of light systems 102 to the conditions that they are capable of generating in an environment 100.

Figure 6:
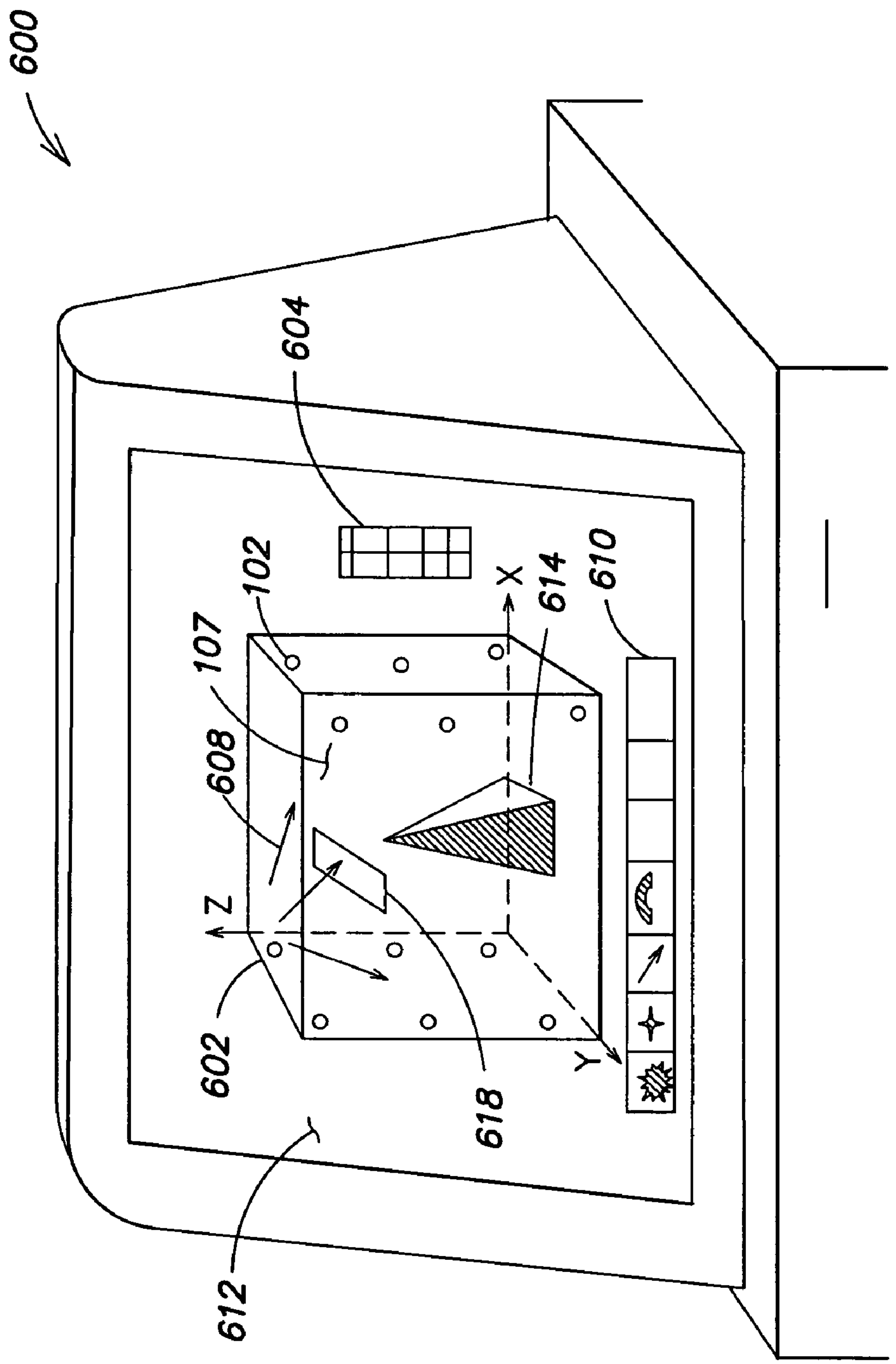
FIG. 6 illustrates a virtual representation of an environment using a computer screen.

In an embodiment, configuration information such as the configuration file 500 may be generated using a program executed on a processor. Referring to FIG. 6, the program may run on a computer 600 with a graphical user interface 612 where a representation of an environment 602 can be displayed, showing light systems 102, lit surfaces 107 or other elements in a graphical format. The interface may include a representation 602 of a room for example. Representations of lights, lighted surfaces or other systems may then be presented in the interface 612 and locations can be assigned to the system. In an embodiment, position coordinates or a position map may represent a system, such as a light system. A position map may also be generated for the representation of a lighted surface for example. FIG. 6 illustrates a room with light systems 102.

The representation 602 can also be used to simplify generation of effects. For example, a set of stored effects can be represented by icons 610 on the screen 612. An explosion icon can be selected with a cursor or mouse, which may prompt the user to click on a starting and ending point for the explosion in the coordinate system. By locating a vector in the representation, the user can cause an explosion to be initiated in the upper corner of the room 602 and a wave of light and or sound may propagate through the environment.

With all of the light systems 102 in predetermined positions, as identified in the configuration file 500, the representation of the explosion can be played in the room by the light system and or another system such as a sound system.

In use, a control system such as used herein can be used to provide information to a user or programmer from the light systems 102 in response to or in coordination with the information being provided to the user of the computer 600. One example of how this can be provided is in conjunction with the user generating a computer animation on the computer 600. The light system 102 may be used to create one or more light effects in response to displays 612 on the computer 600. The lighting effects, or illumination effects, can produce a vast variety of effects including color-changing effects; stroboscopic effects; flashing effects; coordinated lighting effects; lighting effects coordinated with other media such as video or audio; color wash where the color changes in hue, saturation or intensity over a period of time; creating an ambient color; color fading; effects that simulate movement such as a color chasing rainbow, a flare streaking across a room, a sun rising, a plume from an explosion, other moving effects; and many other effects. The effects that can be generated are nearly limitless. Light and color continually surround the user, and controlling or changing the illumination or color in a space can change emotions, create atmosphere, provide enhancement of a material or object, or create other pleasing and or useful effects. The user of the computer 600 can observe the effects while modifying them on the display 612, thus enabling a feedback loop that allows the user to conveniently modify effects.

Figure 7:
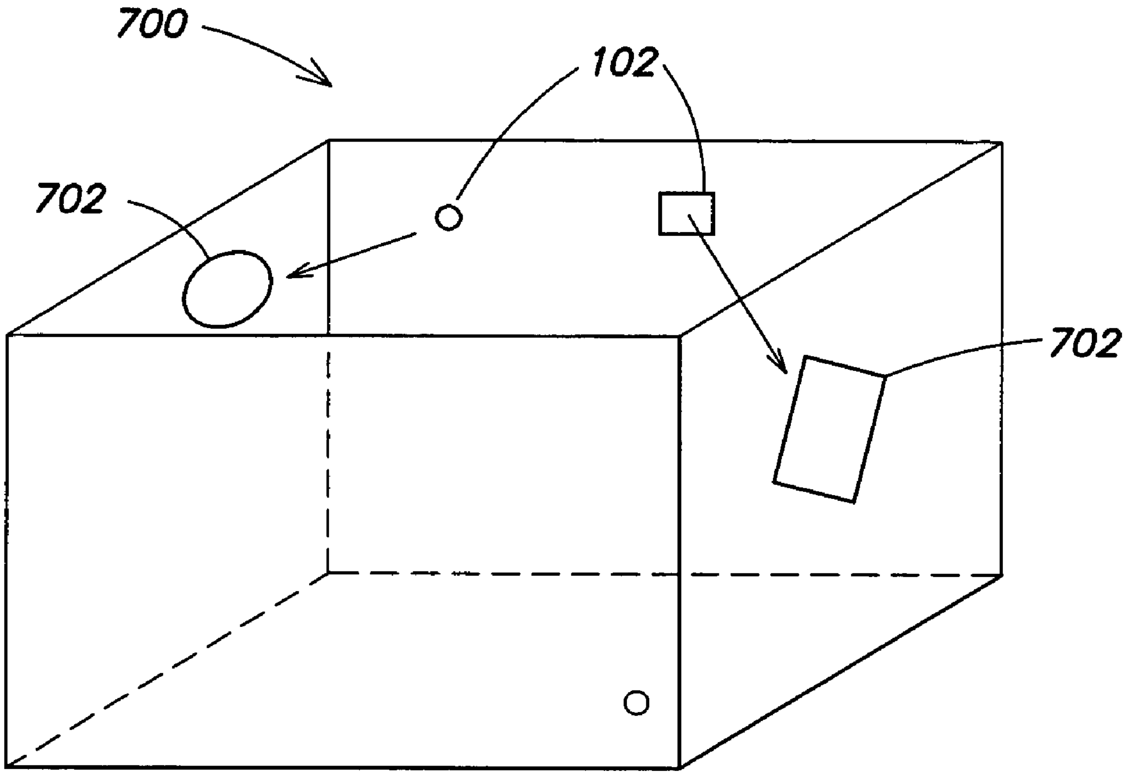
FIG. 7 is a representation of an environment with light systems that project light onto portions of the environment.

FIG. 7 illustrates how the light from a given light system 102 may be displayed on a surface. A light system 102, sound system, or other system may project onto a surface. In the case of a light system 102, this may be an area 702 that is illuminated by the light system 102. The light system 102, or other system, may also move, so the area 107 may move as well. In the case of a sound system, this may be the area where the user desires the sound to emanate from.

In an embodiment, the information generated to form the image or representation may be communicated to a light system 102 or plurality of light systems 102. The information may be sent to lighting systems as generated in a configuration file. For example, the image may represent an explosion that begins in the upper right hand corner of a room and the explosion may propagate through the room. As the image propagates through its calculated space, control signals can be communicated to lighting systems in the corresponding space. The communication signal may cause the lighting system to generate light of a given hue, saturation and intensity when the image is passing through the lighted space the lighting systems projects onto. An embodiment of the invention projects the image through a lighting system. The image may also be projected through a computer screen or other screen or projection device. In an embodiment, a screen may be used to visualize the image prior or during the playback of the image on a lighting system. In an embodiment, sound or other effects may be correlated with the lighting effects. For example, the peak intensity of a light wave propagating through a space may be just ahead of a sound wave. As a result, the light wave may pass through a room followed by a sound wave. The light wave may be played back on a lighting system and the sound wave may be played back on a sound system. This coordination can create effects that appear to be passing through a room or they can create various other effects.

Referring to FIG. 6, an effect can propagate through a virtual environment that is represented in 3D on the display screen 612 of the computer 600. In embodiments, the effect can be modeled as a vector or plane moving through space over time. Thus, all light systems 102 that are located on the plane of the effect in the real world environment can be controlled to generate a certain type of illumination when the effect plane propagates through the light system plane. This can be modeled in the virtual environment of the display screen, so that a developer can drag a plane through a series of positions that vary over time. For example, an effect plane 618 can move with the vector 608 through the virtual environment. When the effect plan 618 reaches a polygon 614, the polygon can be highlighted in a color selected from the color palette 604. A light system 102 positioned on a real world object that corresponds to the polygon can then illuminate in the same color in the real world environment. Of course, the polygon could be any configuration of light systems on any object, plane, surface, wall, or the like, so the range of 3D effects that can be created is unlimited.

In an embodiment, the image information may be communicated from a central controller. The information may be altered before a lighting system responds to the information. For example, the image information may be directed to a position within a position map. All of the information directed at a position map may be collected prior to sending the information to a lighting system. This may be accomplished every time the image is refreshed or every time this section of the image is refreshed or at other times. In an embodiment, an algorithm may be performed on information that is collected. The algorithm may average the information, calculate and select the maximum information, calculate and select the minimum information, calculate and select the first quartile of the information, calculate and select the third quartile of the information, calculate and select the most used information calculate and select the integral of the information or perform another calculation on the information. This step may be completed to level the effect of the lighting system in response to information received. For example, the information in one refresh cycle may change the information in the map several times and the effect may be viewed best when the projected light takes on one value in a given refresh cycle.

In an embodiment, the information communicated to a lighting system may be altered before a lighting system responds to the information. The information format may change prior to the communication for example. The information may be communicated from a computer through a USB port or other communication port and the format of the information may be changed to a lighting protocol such as DMX when the information is communicated to the lighting system. In an embodiment, the information or control signals may be communicated to a lighting system or other system through a communications port of a computer, portable computer, notebook computer, personal digital assistant or other system. The information or control signals may also be stored in memory, electronic or otherwise, to be retrieved at a later time. Systems such the iPlayer and SmartJack systems manufactured and sold by Color Kinetics Incorporated can be used to communicate and or store lighting control signals.

In an embodiment, several systems may be associated with position maps and the several systems may a share position map or the systems may reside in independent position areas. For example, the position of a lighted surface from a first lighting system may intersect with a lighted surface from a second lighting system. The two systems may still respond to information communicated to the either of the lighting systems. In an embodiment, the interaction of two lighting systems may also be controlled. An algorithm, function or other technique may be used to change the lighting effects of one or more of the lighting systems in a interactive space. For example, if the interactive space is greater than half of the non-interactive space from a lighting system, the lighting system's hue, saturation or brightness may be modified to compensate the interactive area. This may be used to adjust the overall appearance of the interactive area or an adjacent area for example.

Control signals generated using methods and or systems according to the principles of the present invention can be used to produce a vast variety of effects. Imagine a fire or explosion effect that one wishes to have move across a wall or room. It starts at one end of the room as a white flash that quickly moves out followed by a highbrightness yellow wave whose intensity varies as it moves through the room. When generating a control signal according to the principles of the present invention, a lighting designer does not have to be concerned with the lights in the room and the timing and generation of each light system's lighting effects. Rather the designer only needs to be concerned with the relative position or actual position of those lights in the room. The designer can lay out the lighting in a room and then associate the lights in the room with graphical information, such as pixel information, as described above. The designer can program the fire or explosion effect on a computer, using Flash 5 for example, and the information can be communicated to the light systems 102 in an environment. The position of the lights in the environment may be considered as well as the surfaces 107 or areas 702 that are going to be lit.

In an embodiment, the lighting effects could also be coupled to sound that will add to and reinforce the lighting effects. An example is a 'red alert' sequence where a 'whoop whoop' siren-like effect is coupled with the entire room pulsing red in concert with the sound. One stimulus reinforces the other. Sounds and movement of an earthquake using low frequency sound and flickering lights is another example of coordinating these effects. Movement of light and sound can be used to indicate direction.

In an embodiment the lights are represented in a two-dimensional or plan view. This allows representation of the lights in a plane where the lights can be associated with various pixels. Standard computer graphics techniques can then be used for effects. Animation tweening and even standard tools may be used to create lighting effects. Macromedia Flash works with relatively low-resolution graphics for creating animations on the web. Flash uses simple vector graphics to easily create animations. The vector representation is efficient for streaming applications such as on the World Wide Web for sending animations over the net. The same technology can be used to create animations that can be used to derive lighting commands by mapping the pixel information or vector information to vectors or pixels that correspond to positions of light systems 102 within a coordinate system for an environment 100.

For example, an animation window of a computer 600 can represent a room or other environment of the lights. Pixels in that window can correspond to lights within the room or a low-resolution averaged image can be created from the higher resolution image. In this way lights in the room can be activated when a corresponding pixel or neighborhood of pixels turn on. Because LED-based lighting technology can create any color on demand using digital control information, see U.S. Pat. Nos. 6,016,038, 6,150,774, and 6,166,496, the lights can faithfully recreate the colors in the original image.

Some examples of effects that could be generated using systems and methods according to the principles of the invention include, but are not limited to, explosions, colors, underwater effects, turbulence, color variation, fire, missiles, chases, rotation of a room, shape motion, tinkerbell-like shapes, lights moving in a room, and many others. Any of the effects can be specified with parameters, such as frequencies, wavelengths, wave widths, peak-to-peak measurements, velocities, inertia, friction, speed, width, spin, vectors, and the like. Any of these can be coupled with other effects, such as sound.

In computer graphics, anti-aliasing is a technique for removing staircase effects in imagery where edges are drawn and resolution is limited. This effect can be seen on television when a narrow striped pattern is shown. The edges appear to crawl like ants as the lines approach the horizontal. In a similar fashion, the lighting can be controlled in such a way as to provide a smoother transition during effect motion. The effect parameters such as wave width, amplitude, phase or frequency can be modified to provide better effects.

Figure 8:
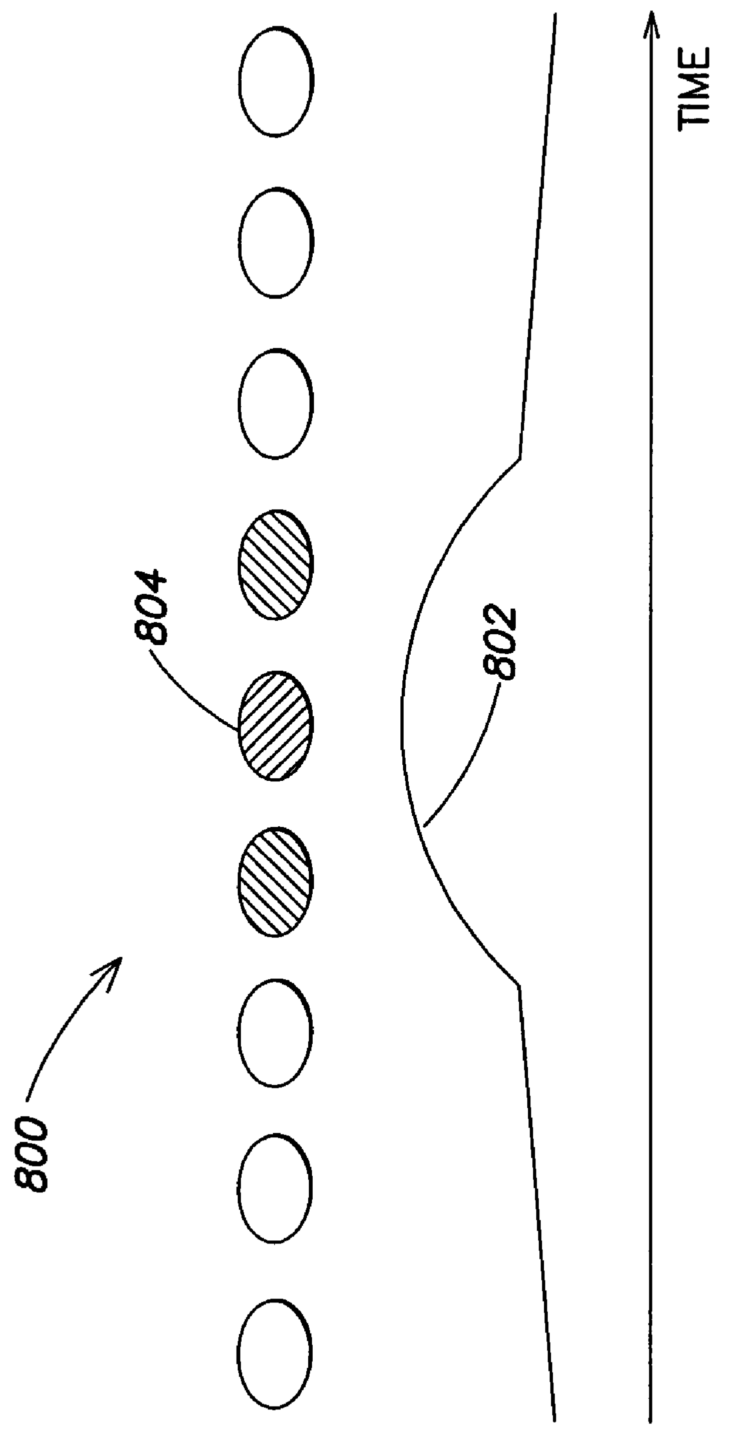
FIG. 8 is a schematic diagram showing the propagation of an effect through a light system.

For example, referring to FIG. 8, a schematic diagram 800 has circles that represent a single light 804 over time. For an effect to 'traverse' this light, it might simply have a step function that causes the light to pulse as the wave passes through the light. However, without the notion of width, the effect might be indiscernible. The effect preferably has width. If however, the effect on the light was simply a step function that turned on for a period of time, then might appear to be a harsh transition, which may be desirable in some cases but for effects that move over time (i.e. have some velocity associated with them) then this would not normally be the case.

The wave 802 shown in FIG. 8 has a shape that corresponds to the change. In essence it is a visual convolution of the wave 802 as it propagates through a space. So as a wave, such as from an explosion, moves past points in space, those points rise in intensity from zero, and can even have associated changes in hue or saturation, which gives a much more realistic effect of the motion of the effect. At some point, as the number and density of lights increases, the room then becomes an extension of the screen and provides large sparse pixels. Even with a relatively small number of light systems 102 the effect eventually can serve as a display similar to a large screen display.

Effects can have associated motion and direction, i.e. a velocity. Even other physical parameters can be described to give physical parameters such as friction, inertia, and momentum. Even more than that, the effect can have a specific trajectory. In an embodiment, each light may have a representation that gives attributes of the light. This can take the form of 2D position, for example. A light system 102 can have all various degrees of freedom assigned (e.g., xyz-rpy), or any combination.

The techniques listed here are not limited to lighting. Control signals can be propagated through other devices based on their positions, such as special effects devices such as pyrotechnics, smell-generating devices, fog machines, bubble machines, moving mechanisms, acoustic devices, acoustic effects that move in space, or other systems.

Figure 9:
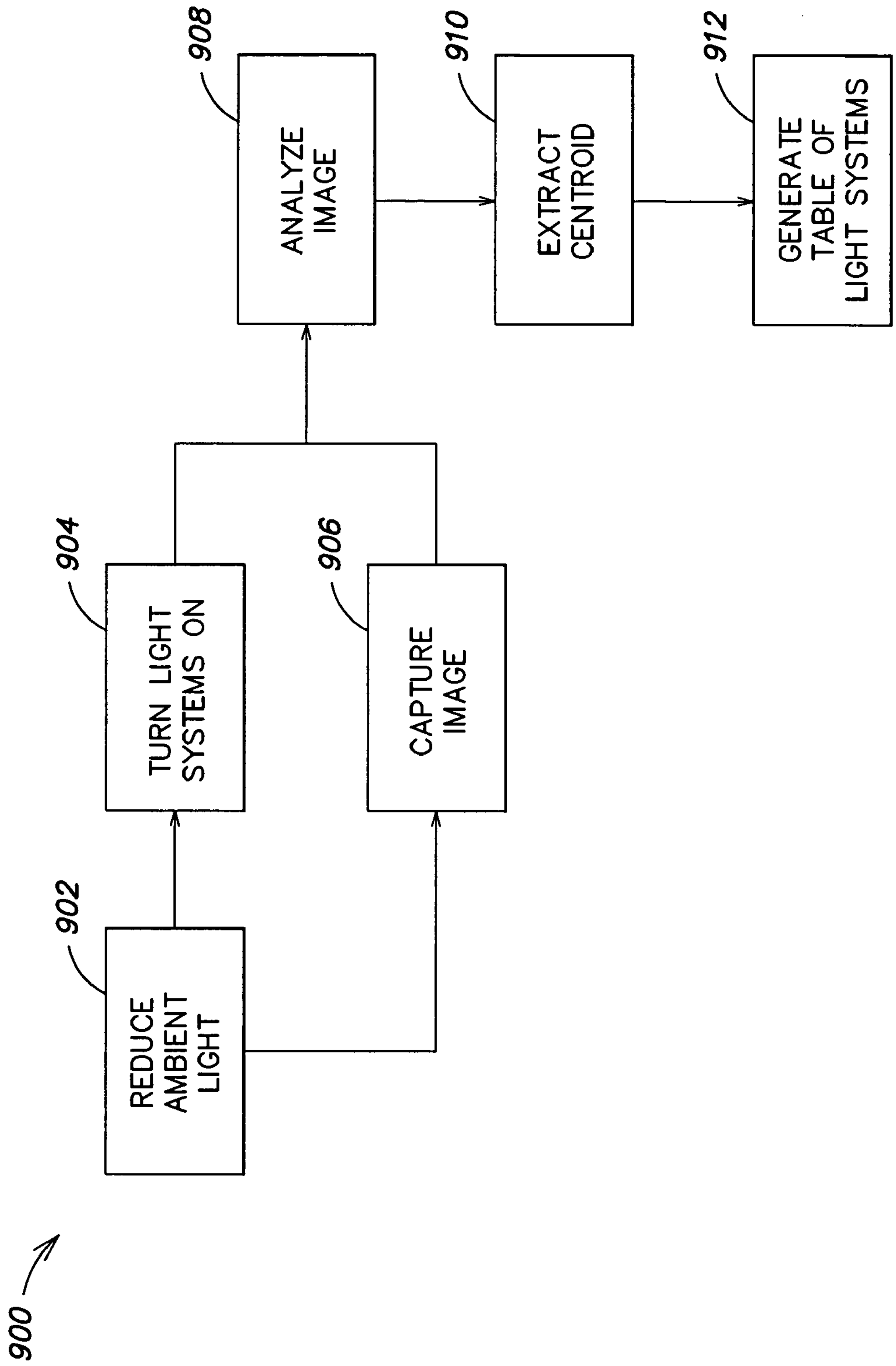
FIG. 9 is a flow diagram showing steps for using an image capture device to determine the positions of a plurality of light systems in an environment.

An embodiment of the present invention is a method of automatically capturing the position of the light systems 102 within an environment. An imaging device may be used as a means of capturing the position of the light. A camera, connected to a computing device, can capture the image for analysis can calculation of the position of the light. FIG. 9 depicts a flow diagram 900 that depicts a series of steps that may be used to accomplish this method. First, at a step 902, the environment to be mapped may be darkened by reducing ambient light. Next, at a step 904, control signals can be sent to each light system 102, commanding the light system 102 to turn on and off in turn. Simultaneously, the camera can capture an image during each "on" time at a step 906. Next, at a step 908, the image is analyzed to locate the position of the "on" light system 102. At a step 910 a centroid can be extracted. Because no other light is present when the particular light system 102 is on, there is little issue with other artifacts to filter and remove from the image. Next, at a step 912, the centroid position of the light system 102 is stored and the system generates a table of light systems 102 and centroid positions. This data can be used to populate a configuration file, such as that depicted in connection with FIG. 5. In sum, each light system 102, in turn, is activated, and the centroid measurement determined. This is done for all of the light systems 102. An image thus gives a position of the light system in a plane, such as with (x,y) coordinates.

Where a 3D position is desired a second image may be captured to triangulate the position of the light in another coordinate dimension. This is the stereo problem. In the same way human eyes determine depth through the correspondence and disparity between the images provided by each eye, a second set of images may be taken to provide the correspondence. The camera is either duplicated at a known position relative to the first camera or the first camera is moved a fixed distance and direction. This movement or difference in position establishes the baseline for the two images and allows derivation of a third coordinate (e.g., (x,y,z)) for the light system 102.

Figure 10:
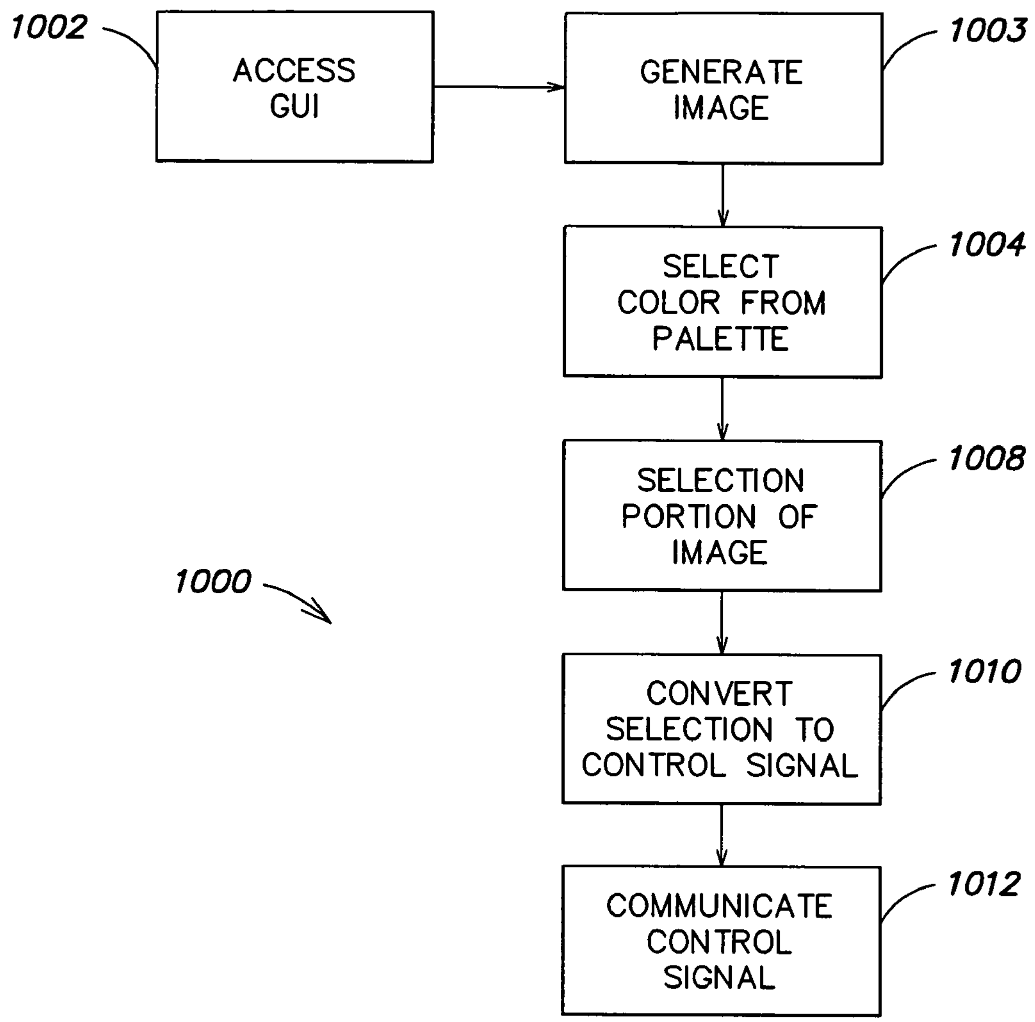
FIG. 10 is a flow diagram showing steps for interacting with a graphical user interface to generate a lighting effect in an environment.

Another embodiment of the invention is depicted in FIG. 10, which contains a flow diagram 1000 with steps for generating a control signal. First, at a step 1002 a user can access a graphical user interface, such as the display 612 depicted in FIG. 6. Next, at a step 1003, the user can generate an image on the display, such as using a graphics program or similar facility. The image can be a representation of an environment, such as a room, wall, building, surface, object, or the like, in which light systems 102 are disposed. It is assumed in connection with FIG. 10 that the configuration of the light systems 102 in the environment is known and stored, such as in a table or configuration file 500. Next, at a step 1004, a user can select an effect, such as from a menu of effects. In an embodiment, the effect may be a color selected from a color palette. The color might be a color temperature of white. The effect might be another effect, such as described herein. In an embodiment, generating the image 1003 may be accomplished through a program executed on a processor. The image may then be displayed on a computer screen. Once a color is selected from the palette at the step 1004, a user may select a portion of the image at a step 1008. This may be accomplished by using a cursor on the screen in a graphical user interface where the cursor is positioned over the desired portion of the image and then the portion is selected with a mouse. Following the selection of a portion of the image, the information from that portion can be converted to lighting control signals at a step 1010. This may involve changing the format of the bit stream or converting the information into other information. The information that made the image may be segmented into several colors such as red, green, and blue. The information may also be communicated to a lighting system in, for example, segmented red, green, and blue signals. The signal may also be communicated to the lighting system as a composite signal at a step 1012. This technique can be useful for changing the color of a lighting system. For example, a color palette may be presented in a graphical user interface and the palette may represent millions of different colors. A user may want to change the lighting in a room or other area to a deep blue. To accomplish her task, the user can select the color from the screen using a mouse and the lighting in the room changes to match the color of the portion of the screen she selected. Generally, the information on a computer screen is presented in small pixels of red, green and blue. LED systems, such as those found in U.S. Pat. Nos. 6,016,038, 6,150,774 and 6,166,496, may include red, green and blue lighting elements as well. The conversion process from the information on the screen to control signals may be a format change such that the lighting system understands the commands. However, in an embodiment, the information or the level of the separate lighting elements may be the same as the information used to generate the pixel information. This provides for an accurate duplication of the pixel information in the lighting system.

Using the techniques described herein, including techniques for determining positions of light systems in environments, techniques for modeling effects in environments (including time- and geometry-based effects), and techniques for mapping light system environments to virtual environments, it is possible to model an unlimited range of effects in an unlimited range of environments. Effects need not be limited to those that can be created on a square or rectangular display. Instead, light systems can be disposed in a wide range of lines, strings, curves, polygons, cones, cylinders, cubes, spheres, hemispheres, non-linear configurations, clouds, and arbitrary shapes and configurations, then modeled in a virtual environment that captures their positions in selected coordinate dimensions. Thus, light systems can be disposed in or on the interior or exterior of any environment, such as a room, building, home, wall, object, product, retail store, vehicle, ship, airplane, pool, spa, hospital, operating room, or other location.

In embodiments, the light system may be associated with code for the computer application, so that the computer application code is modified or created to control the light system. For example, object-oriented programming techniques can be used to attach attributes to objects in the computer code, and the attributes can be used to govern behavior of the light system. Object oriented techniques are known in the field, and can be found in texts such as "Introduction to Object-Oriented Programming" by Timothy Budd, the entire disclosure of which is herein incorporated by reference. It should be understood that other programming techniques may also be used to direct lighting systems to illuminate in coordination with computer applications, object oriented programming being one of a variety of programming techniques that would be understood by one of ordinary skill in the art to facilitate the methods and systems described herein.

In an embodiment, a developer can attach the light system inputs to objects in the computer application. For example, the developer may have an abstraction of a light system 102 that is added to the code construction, or object, of an application object. An object may consist of various attributes, such as position, velocity, color, intensity, or other values. A developer can add light as an instance in the object in the code of a computer application. For example, the object could be vector in an object-oriented computer animation program or solid modeling program, with attributes, such as direction and velocity. A light system 102 can be added as an instance of the object of the computer application, and the light system can have attributes, such as intensity, color, and various effects. Thus, when events occur in the computer application that call on the object of the vector, a thread running through the program can draw code to serve as an input to the processor of the light system. The light can accurately represent geometry, placement, spatial location, represent a value of the attribute or trait, or provide indication of other elements or objects.

Figure 12:
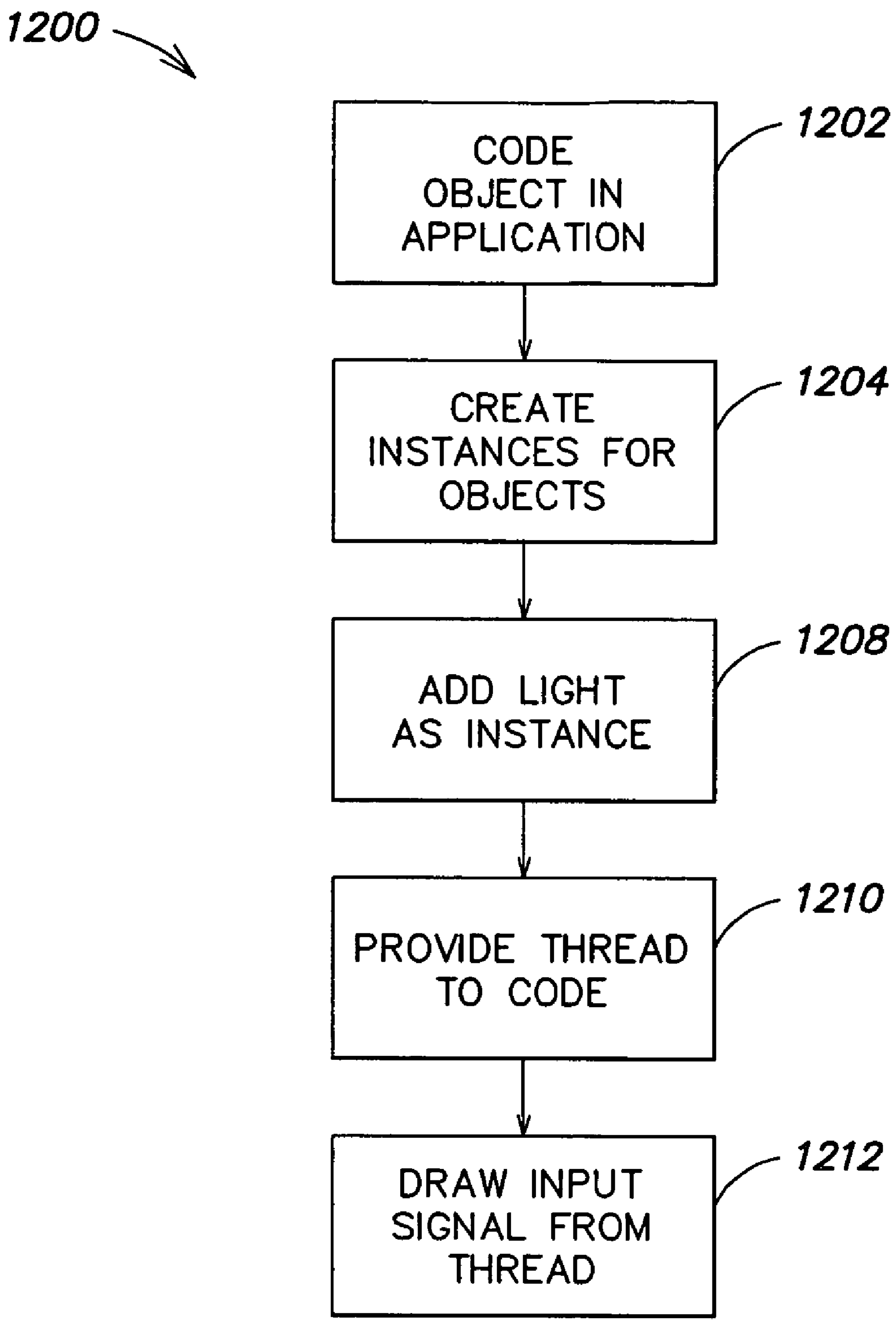
FIG. 12 is a flow diagram showing steps for generating a control signal for a light system using an object-oriented programming technique.

Referring to FIG. 12, a flow chart 1200 provides steps for a method of providing for coordinated illumination. At the step 1202, the programmer codes an object for a computer application, using, for example, object-oriented programming techniques. At a step 1204, the programming creates instances for each of the objects in the application. At a step 1208, the programmer adds light as an instance to one or more objects of the application. At a step 1210, the programmer provides for a thread, running through the application code. At a step 1212, the programmer provides for the thread to draw lighting system input code from the objects that have light as an instance. At a step 1214, the input signal drawn from the thread at the step 1212 is provided to the light system, so that the lighting system responds to code drawn from the computer application.

Using such object-oriented light input to the light system 102 from code for a computer application, various lighting effects can be associated in the real world environment with the virtual world objects of a computer application. For example, in animation of an effect such as explosion of a polygon, a light effect can be attached with the explosion of the polygon, such as sound, flashing, motion, vibration and other temporal effects. Further, the light system 102 could include other effects devices including sound producing devices, motion producing devices, fog machines, rain machines or other devices which could also produce indications related to that object.

Figure 13:
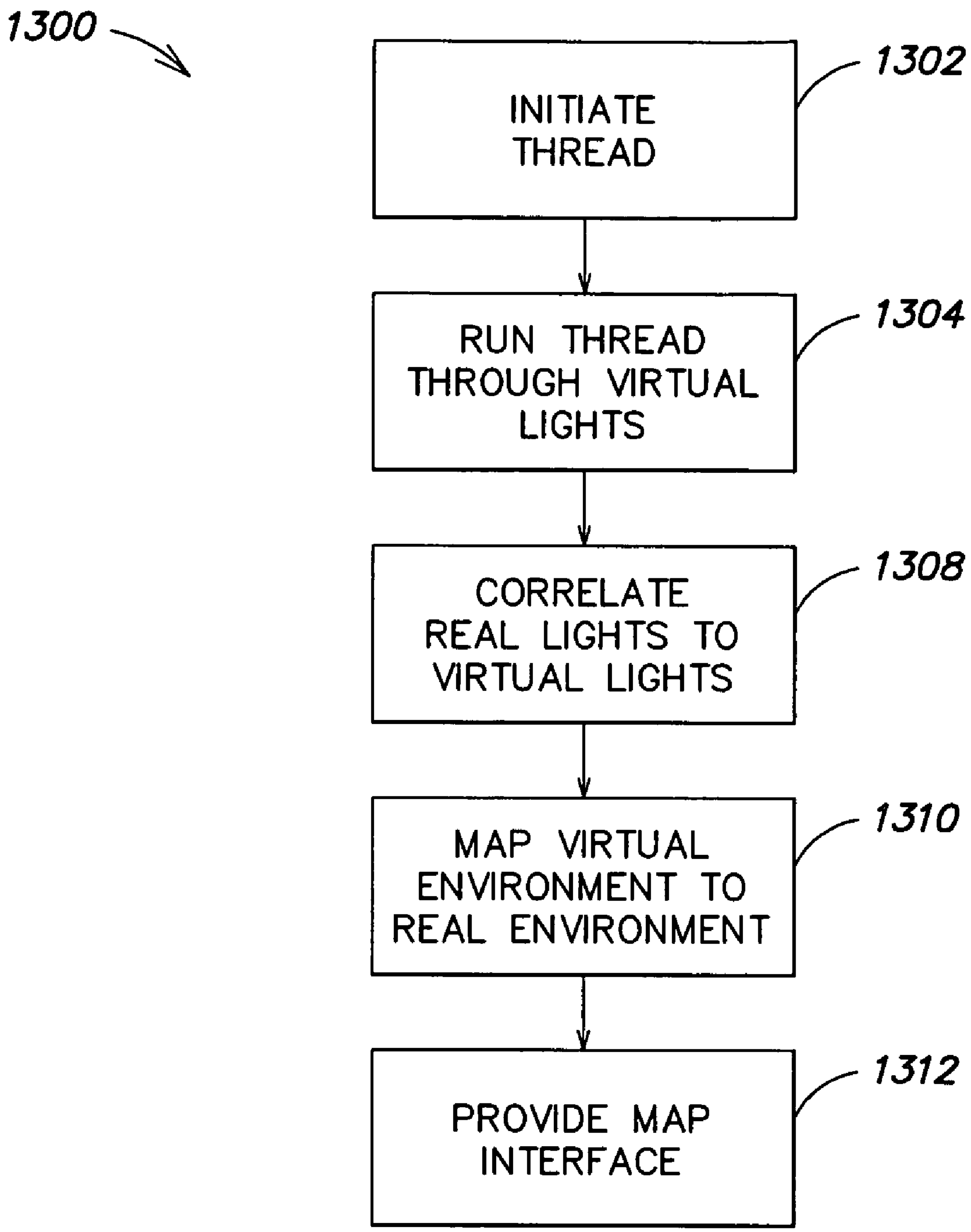
FIG. 13 is a flow diagram for executing a thread to generate a lighting signal for a real world light system based on data from a computer application.

Referring to FIG. 13, a flow diagram 1300 depicts steps for coordinated illumination between a representation on virtual environment of a computer screen and a light system 102 or set of light systems 102 in a real environment. In embodiments, program code for control of the light system 102 has a separate thread running on the machine that provides its control signals. At a step 1302 the program initiates the thread. At a step 1304 the thread as often as possible runs through a list of virtual lights, namely, objects in the program code that represent lights in the virtual environment. At a step 1308 the thread does three-dimensional math to determine which real-world light systems 102 in the environment are in proximity to a reference point in the real world (e.g., a selected surface 107) that is projected as the reference point of the coordinate system of objects in the virtual environment of the computer representation. Thus, the (0,0,0) position can be a location in a real environment and a point on the screen in the display of the computer application (for instance the center of the display. At a step 1310, the code maps the virtual environment to the real world environment, including the light systems 102, so that events happening outside the computer screen are similar in relation to the reference point as are virtual objects and events to a reference point on the computer screen.

At a step 1312, the host of the method may provide an interface for mapping. The mapping function may be done with a function, e.g., "project-all-lights," as described in Directlight API described below and in Appendix A, that maps real world lights using a simple user interface, such as drag and drop interface. The placement of the lights may not be as important as the surface the lights are directed towards. It may be this surface that reflects the illumination or lights back to the environment and as a result it may be this surface that is the most important for the mapping program. The mapping program may map these surfaces rather than the light system locations or it may also map both the locations of the light systems and the light on the surface.

A system for providing the code for coordinated illumination may be any suitable computer capable of allowing programming, including a processor, an operating system, and memory, such as a database, for storing files for execution.

Each real light 102 may have attributes that are stored in a configuration file. An example of a structure for a configuration file is depicted in FIG. 5. In embodiments, the configuration file may include various data, such as a light number, a position of each light, the position or direction of light output, the gamma (brightness) of the light, an indicator number for one or more attributes, and various other attributes. By changing the coordinates in the configuration file, the real world lights can be mapped to the virtual world represented on the screen in a way that allows them to reflect what is happening in the virtual environment. The developer can thus create time-based effects, such as an explosion. There can then be a library of effects in the code that can be attached to various application attributes. Examples include explosions, rainbows, color chases, fades in and out, etc. The developer attaches the effects to virtual objects in the application. For example, when an explosion is done, the light goes off in the display, reflecting the destruction of the object that is associated with the light in the configuration file.

To simplify the configuration file, various techniques can be used. In embodiments, hemispherical cameras, sequenced in turn, can be used as a baseline with scaling factors to triangulate the lights and automatically generate a configuration file without ever having to measure where the lights are. In embodiments, the configuration file can be typed in, or can be put into a graphical user interface that can be used to drag and drop light sources onto a representation of an environment. The developer can create a configuration file that matches the fixtures with true placement in a real environment. For example, once the lighting elements are dragged and dropped in the environment, the program can associate the virtual lights in the program with the real lights in the environment. An example of a light authoring program to aid in the configuration of lighting is included in U.S. patent application Ser. No. 09/616,214 "Systems and Methods for Authoring Lighting Sequences." Color Kinetics Inc. also offers a suitable authoring and configuration program called "ColorPlay."

Further details as to the implementation of the code can be found in the Directlight API document attached hereto as Appendix A. Directlight API is a programmer's interface that allows a programmer to incorporate lighting effects into a program. Directlight API is attached in Appendix A and the disclosure incorporated by reference herein. Object oriented programming is just one example of a programming technique used to incorporate lighting effects. Lighting effects could be incorporated into any programming language or method of programming. In object oriented programming, the programmer is often simulating a 3D space.

In the above examples, lights were used to indicate the position of objects which produce the expected light or have light attached to them. There are many other ways in which light can be used. The lights in the light system can be used for a variety of purposes, such as to indicate events in a computer application (such as a game), or to indicate levels or attributes of objects.

Simulation types of computer applications are often 3D rendered and have objects with attributes as well as events. A programmer can code events into the application for a simulation, such as a simulation of a real world environment. A programmer can also code attributes or objects in the simulation. Thus, a program can track events and attributes, such as explosions, bullets, prices, product features, health, other people, patterns of light, and the like. The code can then map from the virtual world to the real world. In embodiments, at an optional step, the system can add to the virtual world with real world data, such as from sensors or input devices. Then the system can control real and virtual world objects in coordination with each other. Also, by using the light system as an indicator, it is possible to give information through the light system that aids a person in the real world environment.

Architectural visualization, mechanical engineering models, and other solid modeling environments are encompassed herein as embodiments. In these virtual environments lighting is often relevant both in a virtual environment and in a solid model real world visualization environment. The user can thus position and control a light system 102 the illuminates a real world sold model to illuminate the real world solid model in correspondence to illumination conditions that are created in the virtual world modeling environment. Scale physical models in a room of lights can be modeled for lighting during the course of a day or year or during different seasons for example, possibly to detect previously unknown interaction with the light and various building surfaces. Another example would be to construct a replica of a city or portion of a city in a room with a lighting system such as those discussed above. The model could then be analyzed for color changes over a period of time, shadowing, or other lighting effects. In an embodiment, this technique could be used for landscape design. In an embodiment, the lighting system is used to model the interior space of a room, building, or other piece of architecture. For example, an interior designer may want to project the colors of the room, or fabric or objects in the room with colors representing various times of the day, year, or season. In an embodiment, a lighting system is used in a store near a paint section to allow for simulation of lighting conditions on paint chips for visualization of paint colors under various conditions. These types of real world modeling applications can enable detection of potential design flaws, such as reflective buildings reflecting sunlight in the eyes of drivers during certain times of the year. Further, the three-dimensional visualization may allow for more rapid recognition of the aesthetics of the design by human beings, than by more complex computer modeling.

Solid modeling programs can have virtual lights. One can light a model in the virtual environment while simultaneously lighting a real world model the same way. For example, one can model environmental conditions of the model and recreate them in the real world modeling environment outside the virtual environment. For example, one can model a house or other building and show how it would appear in any daylight environment. A hobbyist could also model lighting for a model train set (for instance based on pictures of an actual train) and translate that lighting into the illumination for the room wherein the model train exists. Therefore the model train may not only be a physical representation of an actual train, but may even appear as that train appeared at a particular time. A civil engineering project could also be assembled as a model and then a lighting system according to the principles of the invention could be used to simulate the lighting conditions over the period of the day. This simulation could be used to generate lighting conditions, shadows, color effects or other effects. This technique could also be used in Film/Theatrical modeling or could be used to generate special effects in filmmaking. Such a system could also be used by a homeowner, for instance by selecting what they want their dwelling to look like from the outside and having lights be selected to produce that look. This is a possibility for safety when the owner is away. Alternatively, the system could work in reverse where the owner turns on the lights in their house and a computer provides the appearance of the house from various different directions and distances.

Although the above examples discuss modeling for architecture, one of skill in the art would understand that any device, object, or structure where the effect of light on that device, object, or structure can be treated similarly.

Medical or other job simulation could also be performed. A lighting system according to the principles of the present invention may be used to simulate the lighting conditions during a medical procedure. This may involve creating an operating room setting or other environment such as an auto accident at night, with specific lighting conditions. For example, the lighting on highways is generally high-pressure sodium lamps which produce nearly monochromatic yellow light and as a result objects and fluids may appear to be a non-normal color. Parking lots generally use metal halide lighting systems and produce a broad spectrum light that has spectral gaps. Any of these environments could be simulated using a system according to the principles of the invention. These simulators could be used to train emergency personnel how to react in situations lit in different ways. They could also be used to simulate conditions under which any job would need to be performed. For instance, the light that will be experienced by an astronaut repairing an orbiting satellite can be simulated on earth in a simulation chamber.

Lights can also be used to simulate travel in otherwise inaccessible areas such as the light that would be received traveling through space or viewing astronomical phenomena, or lights could be used as a three dimensional projection of an otherwise unviewable object. For instance, a lighting system attached to a computing device could provide a three dimensional view from the inside of a molecular model. Temporal Function or other mathematical concepts could also be visualized.

All articles, patents, and other references set forth above are hereby incorporated by reference. While the invention has been disclosed in connection with the embodiments shown and described in detail, various equivalents, modifications, and improvements will be apparent to one of ordinary skill in the art from the above description.

Important Stuff You Should Read First.

1) The sample program and Real Light Setup won't run until you register the DirectLight.dll COM object with Windows on your computer. Two small programs cleverly named "Register DirectLight.exe" and "Unregister DirectLight.exe" have been included with this install.

2) DirectLight assumes that you have a SmartJack hooked up to COM1. You can change this assumption by editing the DMX_INTERFACE_NUM value in the file "my_lights.h."

About DirectLight

Organization

An application (for example, a 3D rendered game) can create virtual lights within its 3D world. DirectLight can map these lights onto real-world Color Kinetics full spectrum digital lights with color and brightness settings corresponding to the location and color of the virtual lights within the game.

In DirectLights three general types of virtual lights exist:

Dynamic light. The most common form of virtual light has a position and a color value. This light can be moved and it's color changed as often as necessary. Dynamic lights could represent glowing space nebulae, rocket flares, a yellow spotlight flying past a corporate logo, or the bright red eyes of a ravenous mutant ice-weasel.

Ambient light is stationary and has only color value. The sun, an overhead room light, or a general color wash are examples of ambient. Although you can have as many dynamic and indicator lights as you want, you can only have one ambient light source (which amounts to an ambient color value).

Indicator lights can only be assigned to specific real-world lights. While dynamic lights can change position and henceforth will affect different real-world lights, and ambient lights are a constant color which can effect any or all real-world lights, indicator lights will always only effect a single real-world light. Indicators are intended to give feedback to the user separate from lighting, e.g. shield status, threat location, etc.

All these lights allow their color to be changed as often as necessary.

In general, the user will set up the real-world lights. The "my_lights.h" configuration file is created in, and can be edited by, the "DirectLight GUI Setup" program. The API loads the settings from the "my_lights.h" file, which contains all information on where the real-world lights are, what type they are, and which sort of virtual lights (dynamic, ambient, indicator, or some combination) are going to affect them.

Virtual lights can be created and static, or created at run time dynamically. DirectLights runs in it's own thread; constantly poking new values into the lights to make sure they don't fall asleep. After updating your virtual lights you send them to the real-world lights with a single function call. DirectLights handles all the mapping from virtual world to real world.

If your application already uses 3D light sources, implementing DirectLight can be very easy, as your light sources can be mapped 1:1 onto the Virtual_Light class.

A typical setup for action games has one overhead light set to primarily ambient, lights to the back, side and around the monitor set primarily to dynamic, and perhaps some small lights near the screen set to indicators.

The ambient light creates a mood and atmosphere. The dynamic lights around the player give feedback on things happening around him: weapons, environment objects, explosions, etc. The indicator lights give instant feedback on game parameters: shield level, danger, detection, etc.

Effects (LightingFX) can be attached to lights which override or enhance the dynamic lighting. In Star Trek: Armada, for example, hitting Red Alert causes every light in the room to pulse red, replacing temporarily any other color information the lights have.

Other effects can augment. Explosion effects, for example, can be attached to a single virtual light and will play out over time, so rather than have to continuously tweak values to make the fireball fade, virtual lights can be created, an effect attached and started, and the light can be left alone until the effect is done.

Real lights have a coordinate system based on the room they are installed in. Using a person sitting at a computer monitor as a reference, their head should be considered the origin. X increases to their right. Y increases towards the ceiling. Z increases towards the monitor.

Virtual lights are free to use any coordinate system at all. There are several different modes to map virtual lights onto real lights. Having the virtual light coordinate system axis-aligned with the real light coordinate system can make your life much easier.

Light positions can take on any real values. The DirectLight GUI setup program restricts the lights to within 1 meter of the center of the room, but you can change the values by hand to your heart's content if you like. Read about the Projection Types first, though. Some modes require that the real world and virtual world coordinate systems have the same scale.

Getting Started

Installing DirectLight SDK

Running the Setup.exe file will install:

In/Windows/System/three dll files, one for DirectLight, two for low-level communications with the real-world lights via DMX.
- DirectLight.dll
- DMXIO.dll
- DLPORTIO.dll In the folder you installed DirectLight in: Visual C++ project files, source code and header files:
- DirectLight.dsp
- DirectLight.dsw
- etc.
- DirectLight.h
- DirectLight.cpp
- Real_Light.h
- Real_Light.cpp
- Virtual_Light.h
- Virtual_Light.cpp
- etc.

compile time libraries:
- FX_Library.lib
- DirectLight.lib
- DMXIO.lib and configuration files:
- my_lights.h
- light_definitions.h
- GUI_config_file.h
- Dynamic_Localized_Strings.h The "my_lights.h" file is referenced both by DirectLight and DirectLight GUI Setup.exe. "my_lights.h" in turn references "light_definitions.h" The other files are referenced only by DirectLight GUI Setup. Both the DLL and the Setup program use a registry entry to find these files:

HKEY_LOCAL_MACHINE\Software\ColorKinetics\DirectLight\1.00.000\location

Also included in this directory is this documentation, and subfolders: FX_Libraries contain lighting effects which can be accessed by DirectLights. Real Light Setup contains a graphical editor for changing info about the real lights. Sample Program contains a copiously commented program demonstrating how to use DirectLight.

DirectLight COM

The DirectLight DLL implements a COM object which encapsulates the DirectLight functionality. The DirectLight object possesses the DirectLight interface, which is used by the client program.

In order to use the DirectLight COM object, the machine on which you will use the object must have the DirectLight COM server registered (see above: Important Stuff You Should Read First). If you have not done this, the Microsoft COM runtime library will not know where to find your COM server (essentially, it needs the path of DirectLight.dll).

To access the DirectLight COM object from a program (we'll call it a client), you must first include "directlight.h", which contains the definition of the DirectLight COM interface (among other things) and "directlight_i.c", which contains the definitions of the various UIDs of the objects and interfaces (more on this later).

Before you can use any COM services, you must first initialize the COM runtime. To do this, call the CoInitialize function with a NULL parameter:

CoIntialize(NULL);

For our purposes, you don't need to concern yourself with the return value.

Next, you must instantiate a DirectLight object. To do this, you need to call the CoCreateInstance function. This will create an instance of a DirectLight object, and will provide a pointer to the DirectLight interface:

```
HRESULT hCOMError =
    CoCreateInstance(   CLSID__CDirectLight,
                        NULL,
                        CLSCTX__ALL ,
                        IID__IDirectLight,
                        (void **)&pDirectLight);
```

CLSID_CDirectLight is the identifier (declared in directlight_i.c) of the DirectLight object, IID_IDirectLight is the identifier of the DirectLight interface, and pDirectLight is a pointer to the implementation of the DirectLight interface on the object we just instantiated. The pDirectLight pointer will be used by the rest of the client to access the DirectLights functionality.

Any error returned by CoCreateInstance will most likely be REGDB_E_CLASSNOTREG, which indicates that the class isn't registered on your machine. If that's the case, ensure that you ran the Register DirectLight program, and try again.

When you're cleaning up your app, you should include the following three lines:

```
    // kill the COM object
    pDirectLight->Release( );
// We ask COM to unload any unused COM Servers.
CoFreeUnusedLibraries( );
    // We're exiting this app so shut down the COM Library.
    CoUninitialize( );
```

You absolutely must release the COM interface when you are done using it. Failure to do so will result in the object remaining in memory after the termination of your app.

CoFreeUnusedLibraries( ) will ask COM to remove our DirectLight factory (a server that created the COM object when we called CoCreateInstance( )) from memory, and CoUninitialize( ) will shut down the COM library.

DirectLight Class

The DirectLight class contains the core functionality of the API. It contains functionality for setting ambient light values, global brightness of all the lights (gamma), and adding and removing virtual lights.

Types:

```
enum Projection__Type{
        SCALE__BY__VIRTUAL__DISTANCE__TO__CAM-
        ERA__ONLY = 0,
        SCALE__BY__DISTANCE__AND__ANGLE = 1,
        SCALE__BY__DISTANCE__VIRTUAL__TO__REAL = 2 };
```

For an explanation of these values, see "Projection Types" in Direct Light Class

```
enum Light__Type{
    C__75 = 0,
    COVE__6 = 1 };
```

For an explanation of these values, see "Light Types" in Direct Light Class, or look at the online help for "DirectLight GUI Setup."

```
enum Curve__Type{
    DIRECTLIGHT__LINEAR = 0,
    DIRECTLIGHT__EXPONENTIAL = 1,
    DIRECTLIGHT__LOGARITHMIC = 2 };
```

These values represent different curves for lighting effects when fading from one color to another.

Public Member Functions:

```
void Set__Ambient__Light( int R,
        int G,
        int B   );
```

The Set_Ambient_Light function sets the red, green and blue values of the ambient light to the values passed into the function. These values are in the range 0-MAX_LIGHT-_BRIGHTNESS. The Ambient light is designed to represent constant or "Room Lights" in the application. Ambient Light can be sent to any or all real of the real-world lights. Each real world light can include any percentage of the ambient light.

void Stir_Lights( void *user_data );

Stir_Lights sends light information to the real world lights based on the light buffer created within DirectLights. The DirectLight DLL handles stirring the lights for you. This function is normally not called by the application

```
Virtual__Light * Submit__Virtual__Light(   float xpos,
                                           float ypos,
                                           float zpos,
                                           int red,
                                           int green,
                                           int blue   );
```

Submit_Virtual_Light creates a Virtual_Light instance. Its virtual position is specified by the first three values passed in, it's color by the second three. The position should use application space coordinates. The values for the color are in the range 0-MAX_LIGHT_BRIGHTNESS. This function returns a pointer to the light created.

void Remove_Virtual_Light( Virtual_Light * bad_light );

Given a pointer to a Virtual_Light instance, Remove_Virtual_Light will delete the virtual light.

void Set_Gamma( float gamma );

The Set_Gamma function sets the gamma value of the Direct Light data structure. This value can be used to control the overall value of all the lights, as every virtual light is multiplied by the gamma value before it is projected onto the real lights.

void Set_Cutoff_Range( float cutoff_range );

Set_Cutoff Range sets the cutoff distance from the camera. Beyond this distance virtual lights will have no effect on real-world lights. Set the value high to allow virtual lights to affect real world lights from a long way away. If the value is small virtual lights must be close to the camera to have any effect. The value should be in application space coordinates.

void Clear_All_Real_Lights( void );

Clear_All_Lights destroys all real lights.

void Project_All_Lights( void );

Project_All_Lights calculates the effect of every virtual on every real-world light, taking into account gamma, ambient and dynamic contributions, position and projection mode, cutoff angle and cutoff range, and sends the values to every real-world light.

```
void Set_Indicator_Color(    int which_indicator,
                             int red,
                             int green,
                             int blue    );
```

Indicators can be assigned to any of the real world lights via the configuration file (my_lights.h). Each indicator must have a unique non-negative integer ID. Set_Indicator_Color changes the color of the indicator designated by which_indicator to the red, green, and blue values specified. If Set_Indicator_Color is called with an indicator id which does not exist, nothing will happen. The user specifies which lights should be indicators, but note that lights that are indicators can still be effected by the ambient and dynamic lights.

Indicator Get_Indicator( int which_indicator );

Returns a pointer to the indicator with the specified value.

int Get_Real_Light_Count( void );

Returns the number of real lights.

void Get_My_Lights_Location( char buffer[MAX_PATH] );

Looks in the directory and finds the path to the "my_lights.h" file.

void Load_Real_Light_Configuration( char * fullpath = NULL );

Loads the "my_lights.h" file from the default location determined by the registry. DirectLight will create a list of real lights based on the information in the file.

```
void Submit_Real_Light( char * indentifier,
                        int DMX_port,
                        Projection_Type projection_type,
                        int indicator_number,
                        float add_ambient,
                        float add_dynamic,
                        float gamma,
                        float cutoff_angle,
                        float x,
                        float y,
                        float z    );
```

Creates a new real light in the real world. Typically DirectLight will load the real light information from the "my_lights.h" file at startup.

void Remove_Real_Light( Real_Light * dead_light );

Safely deletes an instance of a real light.

Light GetAmbientLight ( void );

Returns a pointer to the ambient light.

bool RealLightListEmpty ( void );

Returns true if the list of real lights is empty, false otherwise.

Light Class

Ambient lights are defined as lights. Light class is the parent class for Virtual Lights and Real Lights. Member variables:

static const int MAX_LIGHT_BRIGHTNESS. Defined as 255

LightingFX_List * m_FX_currently_attached. A list of the effects currently attached to this light.

ColorRGB m_color. Every light must have a color! ColorRGB is defined in ColorRGB.h void Attach_FX( LightingFX * new_FX )

Attach a new lighting effect to this virtual light.

void Detach_FX( LightingFX * old_FX )

Detach an old lighting effect from this virtual light.

Real Lights

Real Light inherits from the Light class. Real lights represent lights in the real world. Member variables:

static const int NOT_AN_INDICATOR_LIGHT defined as −1.

char m_identifier[100] is the name of the light (like "overhead" or "covelight1"). Unused by DirectLight except as a debugging tool.

int DMX_port is a unique non-negative integer representing the channel the given light will receive information on. DMX information is sent out in a buffer with 3 bytes (red, green and blue) for each light. (DMX_port * 3) is actually the index of the red value for the specified light. DirectLight DMX buffers are 512 bytes, so DirectLight can support approximately 170 lights. Large buffers can cause performance problems, so if possible avoid using large DMX_port numbers.

Light_Type m_type describes the different models of Color Kinetics lights. Currently unused except by DirectLight GUI Setup to display icons.

float m_add_ambient the amount of ambient light contribution to this lights color. Range 0-1 float m_add_dynamic the amount of dynamic light contribution to this lights color. Range 0-1 float m_gamma is the overall brightness of this light. Range 0-1.

float m_cutoff_angle determines how sensitive the light is to the contribtions of the virtual lights around it. Large values cause it to receive information from most virtual lights. Smaller values cause it to receive contributions only from virtual lights in the same arc as the real light.

Projection_Type m_projection_type defines how the virtual lights map onto the real lights.

SCALE_BY_VIRTUAL_DISTANCE_TO_CAMERA_ONLY this real light will receive contributions from virtual lights based soley on the distance from the origin of the virtual coordinate system to the position of the virtual light. The virtual light contribution fades linearly as the distance from the origin approaches the cutoff range.

SCALE_BY_DISTANCE_AND_ANGLE this real light will receive contributions from virtual lights based on the distance as computed above AND the difference in angle between the real light and the virtual light. The virtual light contribution fades linearly as the distance from the origin approaches the cutoff range and the angle approaches the cutoff angle.

SCALE_BY_DISTANCE_VIRTUAL_TO_REAL this real light will receive contributions from virtual lights based on the distance in 3-space from real light to virtual light. This mode assumes that the real and virtual coordinate systems are identical. The virtual light contribution fades linearly as the distance from real to virtual approaches the cutoff range.

float m_xpos x,y,z position in virtual space.

float m_ypos float m_zpos int m_indicator_number. if indicator is negative the light is not an indicator. If it is non-negative it will only receive colors sent to that indicator number.

Virtual Lights

Virtual Lights represent light sources within a game or other real time application that are mapped onto real-world Color Kinetics lights. Virtual Lights may be created, moved, destroyed, and have their color changed as often as is feasible within the application.

static const int MAX_LIGHT_BRIGHTNESS;

MAX_LIGHT_BRIGHTNESS is a constant representing the largest value a light can have. In the case of most Color Kinetics lights this value is 255. Lights are assumed to have a range that starts at 0

```
void Set_Color(    int R,
                   int G,
                   int B    );
```

The Set_Color function sets the red, green and blue color values of the virtual light to the values passed into the function.

```
void Set_Position(    float x_pos,
                      float y_pos,
                      float z_pos    );
```

The Set_Position function sets the position values of the virtual light to the values passed into the function. The position should use application space coordinates.

```
void Get_Position(    float *x_pos,
                      float *y_pos,
                      float *z_pos    );
```

Gets the position of the light.

Lighting FX

Lighting FX are time-based effects which can be attached to real or virtual lights, or indicators, or even the ambient light. Lighting effects can have other effects as children, in which case the children are played sequentially.

static const int FX_OFF; Defined as −1.

static const int START_TIME; Times to start and stop the effect. This is a virtual value. The static const int STOP_TIME; individual effects will scale their time of play based on the total.

void Set_Real_Time( bool Real_Time );

If TRUE is passed in, this effect will use real world time and update itself as often as Stir_Lights is called. If FALSE is passed in the effect will use application time, and update every time Apply-FX is called.

void Set_Time_Extrapolation ( bool extrapolate );

If TRUE is passed in, this effect will extrapolate it's value when Stir_Lights is called.

void Attach_FX_To_Light ( Light * the_light );

Attach this effect to the light passed in.

```
void Detach_FX_From_Light ( Light * the_light,
                            bool remove_FX_from_light = true );
```

Remove this effect's contribution to the light. If remove_FX_from_light is true, the effect is also detached from the light.

The above functions also exist as versions to effect Virtual lights, Indicator lights (referenced either by a pointer to the indicator or it's number), Ambient light, and all Real Lights.

```
void Start (    float FX_play_time,
                bool looping = false );
```

Start the effect. If looping is true the effect will start again after it ends.

void Stop ( void );

Stop the effect without destroying it.

void Time_Is_Up ( void );

Either loop or stop playing the effect, since time it up for it.

void Update_Time ( float time_passed );

Change how much game time has gone by for this effect.

void Update_Real_Time ( void );

Find out how much real time has passed for this effect.

void Update_Extrapolated_Time ( void );

Change the FX time based on extrapolating how much application time per real time we have had so far.

virtual void Apply_FX ( ColorRGB &base_color );

This is the principle lighting function. When Lighting_FX is inherited, this function does all the important work of actually changing the light's color values over time. Note that you can choose to add your value to the existing light value, replace the existing value with your value, or any combination of the two. This way Lighting effects can override the existing lights or simply supplant them.

static void Update_All_FX_Time ( float time_passed );

Update the time of all the effects.

void Apply_FX_To_All_Virtual_Lights ( void );

Apply this effect to all virtual, ambient and indicator lights that are appropriate.

void Apply_All_FX_To_All_Virtual_Lights ( void );

Apply each effect to all virtual, ambient and indicator lights that are appropriate.

void Apply_All_FX_To _Real_Light ( Real_Light * the_real_light );

Apply this effect to a single real light.

void Start_Next_ChildFX ( void );

If this effect has child effect, start the next one.

```
void Add_ChildFX ( LightingFX * the__child,
                   float timeshare );
```

Add a new child effect onto the end of the list of child effects that this effect has. Timeshare is this child's share of the total time the effect will play. The timeshares don't have to add up to one, as the total shares are scaled to match the total real play time of the effect void Become_Child_Of ( Lighting_FX * the_parent );

Become a parent of the specified effect.

void Inherit_Light_List ( Affected_Lights * our_lights );

Have this effect and all it's children inherit the list of lights to affect.

Configuration File

The file "my_lights.h" contains information about real-world lights, and is loaded into the DirectLight system at startup. The files "my_lights.h" and "light_definitions.h" must be included in the same directory as the application using DirectLights.

"my_lights.h" is created and edited by the DirectLight GUI Setup program. For more information on how to use the program check the online help within the program.

Here is an example of a "my_lights.h" file:

```
////////////////////////////////////////////////////////////
//
// my__lights.h
//
// Configuration file for Color Kinetics lights
//               used by DirectLights
//
// This file created with DirectLights GUI Setup v1.0
//
////////////////////////////////////////////////////////////
// Load up the basic structures
#include "Light__Definitions.h"
// overall gamma
float OVERALL__GAMMA = 1.0;
// which DMX interface do we use?
int DMX__INTERFACE__NUM = 0;
////////////////////////////////////////////////////////////
//
// This is a list of all the real lights in the world
//
Real__Light my__lights[MAX__LIGHTS] =
{
// NAME           PORT  TYPE  PRJ  IND   AMB     DYN     GAMMA   CUTOFF  X       Y       Z
"Overhead",       0,    1,    0,   -1,   1.000,  0.400,  1.000,  3.142,  0.000,  -1.000, 0.000,
"Left",           1,    0,    1,   -1,   0.000,  1.000,  1.000,  1.680,  -1.000, 0.000,  0.000,
"Right",          2,    0,    1,   -1,   0.000,  1.000,  0.800,  1.680,  1.000,  0.000,  0.000,
"Back",           3,    0,    1,   -1,   0.000,  1.000,  1.000,  1.680,  0.000,  0.000,  -1.000,
"LeftCove0",      4,    0,    1,   0,    0.000,  0.000,  1.000,  0.840,  -0.500, -0.300, 0.500,
"LeftCove1",      5,    0,    1,   1,    0.000,  0.000,  1.000,  0.840,  -0.500, 0.100,  0.500,
"LeftCove2",      6,    0,    1,   -1,   0.000,  0.000,  1.000,  0.840,  -0.500, 0.500,  0.500,
"CenterCove0",    7,    0,    1,   -1,   0.000,  0.000,  1.000,  0.840,  -0.400, 0.700,  0.500,
"CenterCove1",    8,    0,    1,   -1,   0.000,  0.000,  1.000,  0.840,  -0.200, 0.700,  0.500,
"CenterCove2",    9,    0,    1,   -1,   0.000,  0.000,  1.000,  0.840,  0.200,  0.700,  0.500,
"CenterCove3",    10,   0,    1,   -1,   0.000,  0.000,  1.000,  0.840,  0.400,  0.700,  0.500,
"RightCove0",     11,   0,    1,   2,    0.000,  0.000,  1.000,  0.840,  0.500,  0.500,  0.500,
"RightCove1",     12,   0,    1,   -1,   0.000,  0.000,  1.000,  0.840,  0.500,  0.100,  0.500,
"RightCove2",     13,   0,    1,   -1,   0.000,  0.000,  1.000,  0.840,  0.500,  -0.300, 0.500,
};
```

This example file is taken from our offices, where we had lights setup around a computer, with the following lights (referenced from someone sitting at the monitor): One overhead (mostly ambient); one on each side of our head (Left and Right); one behind our head; Three each along the top, left and right side of the monitor in front of us.

Each line in the "my_lights" file represents one Real_Light. Each Real_Light instance represents, surprise surprise, one real-world light.

The lower lights on the left and right side of the monitor are indicators 0 and 2, the middle light on the left side of the monitor is indicator 1.

The positional values are in meters. Z is into/out of the plane of the monitor. X is vertical in the plane of the monitor, Y is horizontal in the plane of the monitor.

MAX_LIGHTS can be as high as 170 for each DMX universe. Each DMX universe is usually a single physical connection to the computer (COM1, for example). The larger MAX_LIGHTS is, the slower the lights will respond, as MAX_LIGHTS determines the size of the buffer sent to DMX (MAX_LIGHTS*3) Obviously, larger buffers will take longer to send.

OVERALL_GAMMA can have a value of 0-1. This value is read into DirectLights and can be changed during runtime.

What is claimed is:

1. A method for generating a control signal for a light system, comprising:

providing a light management facility for mapping the positions of a plurality of light systems;

generating a map file that maps the positions of the plurality of light systems;

generating code for a lighting effect based on information derived from at least one graphics file of a computer application;

and generating a lighting control signal to control the light systems based on the code so as to reproduce the lighting effect as an output of the light systems.

2. A method of claim 1, wherein generating the code for the lighting effect comprises generating the at least one graphics file.

3. A method of claim 2, wherein the at least one graphics file comprises at least one 2D graphics file.

4. A method of claim 2, wherein the at least one graphics file comprises at least one 3D graphics file.

5. A method of claim 1, wherein generating the code for the lighting effect comprises using at least one of a bitmap and a vector coordinate.

6. A method of claim 1, wherein generating the code for the lighting effect comprises using a generation function.

7. A method of claim 1, wherein the light management facility generates a configuration file for a plurality of light systems that stores at least one of the position, intensity, color, illumination characteristics, location, and type of the lighting system.

8. A method of claim 7, wherein a configuration file is generated by associating a lighting system with a location in an environment.

9. A method of claim 8 wherein the environment is selected from the group consisting of a building, a wall, a room, a hallway, a corridor, a ceiling, a floor, a transportation environment, a vehicle exterior, a vehicle interior, an indoor environment, an outdoor environment, a pool, a spa, an office, a park, a theme park, and an entertainment venue.

10. A method of claim 7, wherein the configuration file is generated by associating a plurality of addressable light systems with surfaces that are lit by the light systems.

11. A method of claim 1, wherein associating characteristics of the light systems comprises adding light as an instance to at least one object of the computer application.

12. A method of claim 11, wherein adding light as an instance comprises adding a light thread to a computer application.

13. A method of claim 1, wherein generating the lighting control signal comprises using an algorithm of the computer application to generate the lighting control signal.

14. A method of claim 1, further comprising providing a control signal for a lighting system and another system.

15. A method of claim 14, wherein the other system is selected from the group consisting of a lighting system, lighting network, light, LED, LED lighting system, audio system, surround sound system, fog machine, rain machine, and an electromechanical system.

16. A method for controlling an illumination system having a plurality of addressable light systems for illuminating a space, comprising:

providing graphical information which represents at least one illumination effect, wherein the graphical information comprises at least one of a drawing; a photograph; a static image; and a dynamic image;

associating the plurality of addressable light systems with locations in the space; and converting the graphical information to control signals capable of controlling the light systems to illuminate the space to generate the illumination effect represented by the graphical information.

17. A method of claim 16, wherein the light systems are associated with their locations in the environment.

18. A method of claim 16, wherein the light systems are associated with locations that the light systems illuminate in the environment.

19. A method of claim 16, wherein control signals are communicated to a lighting network comprising the plurality of addressable light systems.

20. A method of claim 16, further comprising coordinating another control signal with the lighting control signals.

21. A method of claim 16, wherein the light systems are networked light systems wherein the lighting control signals are packaged into packets of addressed information.

22. A method of claim 21, wherein the addressed information is communicated to the light systems in the lighting network and each of the light systems responds to the control signals that are addressed to the particular lighting system.

23. A method of claim 16, wherein the graphical information is selected from the group consisting of a drawing, photograph, a static image, a dynamic image, and a generated image.

24. A method of claim 23, wherein the graphical information is displayed on a computer screen.

25. A method of claim 16, wherein providing graphical information comprises generating the information using a computer.

26. A method of claim 25, wherein the graphical information is generated using at least one of bitmaps and vector coordinates.

27. A method of claim 25, wherein the graphical information is rendered in 3D space.

28. A method of claim 25, wherein the graphical information is generated by a function.

29. A method of claim 28, wherein the function represents an image selected from the group consisting of lights swirling in a room, balls of light bouncing in a room, and sounds bouncing in a room.

30. A method of claim 28, wherein the function represents randomly generated effects.

31. A method of claim 28, wherein the function relates to an input to the system.

32. A method of claim 31, wherein the input comprises at least one of information, a file, music, a signal, a data stream, a voice stream, a wireless data stream, and a sensed condition.

33. A method of claim 16, wherein the graphical information converted for display on a lighting system without being displayed on a computer screen.

34. A method of claim 16, wherein the control signals include signals for controlling at least one of a color, an intensity, an area, and a propagation rate for an effect that is created using the lighting system.

35. A method of claim 34, wherein the control signals control an effect that simulates an event.

36. A method of claim 35, wherein the event is selected from the group consisting of an explosion, lighting strike, headlights, train passing through a room, bullet shot through a room, light moving through a room, sunrise across a room, or other event.

37. A method of claim 16, wherein signals are used to control the light systems to illuminate at a designated time.

38. A method of claim 16, wherein associating a plurality of addressable light systems with locations in an environment comprises using a graphical user interface.

39. A method of claim 38, wherein the interface includes a representation of a space.

40. A method of claim 39, wherein the space is selected from the group consisting of a room, a corridor, a hall, a building, a display, a booth, a theatre, a retail venue, a store, a shelf, an object, and a product.

41. A method of claim 16, further comprising generating a position map for the representation of a surface that is lit by a lighting system.

42. A method of claim 41, wherein the position map changes over time based on a change of a characteristic of a lighting system.

43. A method of claim 16, further comprising providing a screen for visualizing an effect on the screen prior to sending a control signal to control a lighting system.

44. A method of claim 16, further comprising coordinating another effect with the lighting effect.

45. A method of claim 44, wherein the other effect is selected from the group consisting of a sound effect, a computer effect, a sensory effect, and an information effect.

46. A method of claim 44, wherein the other effect is a sound effect and the sound effect is correlated with the lighting effect.

47. A method for controlling a plurality of addressable light systems, comprising:

accessing a set of graphical information for producing a graphic;

associating the plurality of addressable light systems with locations in an environment; and applying an algorithm to the graphical information to convert the graphical information to control signals capable of controlling the light systems to create a lighting effect in the environment in correspondence to the graphical information.

48. A method of claim 47, wherein the algorithm averages the information.

49. A method of claim 47, wherein the algorithm selects maximum information.

50. A method of claim 47, wherein the algorithm selects a quartile of the information.

51. A method of claim 47, wherein the algorithm calculates and selects the most used information.

52. A method of claim 47, wherein the algorithm calculates and selects an integral of the information.

53. A method of claim 47, wherein the algorithm is based on the effect of the lighting system in response to the information received.

54. A method of claim 47, wherein the graphical information is altered before the lighting systems responds to the graphical information.

55. A method of claim 47, wherein the information is in a format selected from a group consisting of a computer data format, a flash format, a 3D rendering format, a 2D graphics format, a USB format, a serial format, a wireless format, an IP format and a DMX format.

56. A method of claim 47, wherein more than one lighting system is associated with a given position.

57. A method of claim 47, wherein different light systems reside in independent position areas.

58. A method of claim 47, wherein the position of a lighted surface from a first lighting system intersects with a lighted surface from a second lighting system.

59. A method of claim 47, wherein the interaction of two light systems is controlled.

60. A method of claim 47, further comprising:

providing a graphical user interface for associating a light system with a position.

61. A method of claim 60, wherein the light systems are represented in a two-dimensional view.

62. A method of claim 60, wherein the light systems are represented in a 3D view.

63. A method of claim 60, wherein the light systems are represented in a plane wherein the light systems can be associated with various pixels.

64. A method of claim 60, further comprising generating vector graphics to model animated effects by controlling pixels on a display screen.

65. A method of claim 64, wherein the control signals cause the light systems to generate effects that correspond to the animated effects modeled by the vector graphics.

66. A method of claim 60, further comprising mapping pixels of an animated effect to light systems in an environment.

67. A method of claim 66, wherein the animated effects are displayed on the light systems in the environment.

68. A method of claim 67, wherein the effects are designed to be viewed by a viewer of the light systems.

69. A method of claim 67, wherein the effects are designed to be viewed by a viewer of a lighted surface that is lit by the light systems.

70. A method of claim 67, wherein the effect is selected from a group consisting of an explosion, fire, a missile, a ball, a wave, a pattern, a logo, a character, a number, a letter, a brand, a name, an underwater effect, turbulence, apparent motion of an environment, apparent rotation of an environment, motion of a shape, and a moving light.

71. A method of claim 70, wherein the effect is coupled with a sound effect.

72. A method of claim 60, wherein the graphical user interface has a representation that depicts attributes of the lighting system.

73. A method of claim 72, wherein the representation has coordinates reflecting the degrees of freedom of the attributes of the lighting system.

74. A method of claim 47, wherein the effect is generated using a parameter selected from the group consisting of a color, a wavelength, a width, a speed, a velocity, a direction, a spin, a phase, a peak-to-peak value, a color variation, a wave width, an amplitude, a frequency, a friction, an inertia, a trajectory and a momentum.

75. A method of claim 74, wherein the effect is coupled with a sound effect.

76. A method of claim 74, wherein at least one parameter is modified using an anti-aliasing technique.

77. A method of claim 74, wherein the effect is propagated as a wave through an environment.

78. A method of claim 77, wherein a lighting system for the effect is varied continuously in at least one of a saturation, an intensity and a hue to generate the propagation of the wave.

79. A method of claim 47, further comprising providing a signal for control of a non-lighting device, wherein the non-lighting device is selected from the group consisting of a pyrotechnic device, a smell-generating device, a fog machine, a bubble machine, a moving mechanism, a motor, and an acoustic device.

80. A method of generating a lighting effect in an environment, comprising:

generating an image using a non-lighting system;

associating a plurality of light systems with positions in the environment; and using the association of the light systems and the positions to convert the image into control signals for the light systems, wherein the light systems generate an effect that corresponds to the image.

81. A method of claim 80, wherein the image is generated using a program executed with a processor and wherein the image is displayed on a computer screen.

82. A method of claim 80, wherein the image is displayed on a lighting system after being displayed on the computer screen.

83. A method of claim 80, wherein the image is displayed on a lighting system simultaneously with being displayed on a computer screen.

84. A method of claim 80, wherein the image is selected from the group consisting of a rainbow, a color chase, a person, an object, a brand, a logo, a product, an explosion, a propagating plane, a vector-based effect, a flash, and a wave.

85. A method of claim 80, wherein converting comprises changing the format of the information used to generate the image into information used to generate a lighting control signal.

86. A method of claim 85, wherein the lighting control signal comprises a bit stream.

87. A method of claim 86, wherein the bit stream comprises signals for generation of at least two colors.

88. A method of claim 87, wherein the two colors are two colors of white of different color temperature.

89. A method of claim 80, wherein the lighting control signal controls light systems of red, green and blue color.

90. A method of claim 80, wherein the image comprises a color palette representing a plurality of colors.

91. A method of claim 90, wherein the user selects a color from the color palette and selections a portion of the screen, and wherein the light systems in a portion of an environment corresponding to the portion of the screen illuminate in a color corresponding to the color selected from the color palette.

92. A method of claim 80, wherein the information used to generate lighting control signals is the same information used to generate pixel information for display of an image on a computer screen.

93. A method for generating a control signal for a light system, comprising:

providing a light management facility for mapping the positions of a plurality of light systems;

using the light management facility to generate map files that map the positions of a plurality of light systems;

using an animation facility to generate a plurality of graphics files representative of a lighting effect;

associating the positions of the light systems in the map files with data in the graphics files; and generating a lighting control signal to control the light systems using data derived from the graphics files to reproduce the lighting effect as an output of the light systems.

94. A method of claim 93, wherein the animation facility is a flash animation facility.

95. A method of claim 93, wherein the animation facility generates a sequence of 2D graphics files.

96. A method of claim 93, wherein the animation facility generates a sequence of 3D graphics files.

97. A method of claim 96, wherein the 3D graphics files are associated with a vector in 3D space and wherein an effect is generated to move in a plane that is associated with the vector.

98. A method of claim 97, wherein the plane is normal to the vector.

99. A method of claim 93, wherein the graphics files and the map file are associated in an XML file.

100. A method of claim 93, wherein the graphics files and the map file are associated in a data stream.

101. A method of claim 93, wherein the lighting control signals are merged into an animation playback facility.

102. A method of claim 101, wherein the animation playback facility is a flash animation facility.

103. A method of claim 93, wherein the lighting control signal is a DMX format signal.

104. A method of claim 93, wherein the light systems are mapped to show positions that will be viewed directly by a viewer.

105. A method of claim 93, wherein the light systems are mapped to show positions that will be illuminated by the light systems.

106. A method of claim 93, further comprising providing a configuration file for configuring the locations of a plurality of light systems.

107. A method of claim 106, wherein the configuration file accesses a database of light systems to obtain locations of the light systems.

108. A method of claim 93, wherein the light systems are movable light systems, and wherein the map file for the light systems is a time-dependent map file.

109. A method of claim 93, wherein the file stores data to generate a static image.

110. A method of claim 93, wherein the file stores further data associated with changes to the static image.

111. A method, comprising:

obtaining a lighting control signal for a plurality of light systems in an environment;

obtaining a graphics signal from a computer; and modifying the lighting control signal in response to the content of the graphics signal.

112. A method of claim 111, further comprising obtaining a position map for the light systems and modifying the lighting control signal in response to position information from the graphics signal.

113. A method of claim 112, further comprising collecting all information directed to a given position prior to sending a signal for a lighting system of that position.

114. A system, comprising:

a light management facility for mapping the positions of a plurality of light systems and generating a map file that maps the positions of the plurality of light systems;

a controller adapted to generate code for a lighting effect based on information derived from at least one graphics file of a computer application;

and a control signal generator adapted to generate a lighting control signal to control the light systems based on the code so as to reproduce the lighting effect as an output of the light systems.

115. A system of claim 114, wherein the computer application is adapted to generate the at least one computer graphics file.

116. A system of claim 115, wherein the at least one graphics file comprises at least one 2D graphics file.

117. A system of claim 115, wherein the at least one graphics file comprises at least one 3D graphics file.

118. A system of claim 114, wherein the controller is adapted to generate the code for the lighting effect using at least one of a bitmap and a vector coordinate.

119. A system of claim 114, wherein the controller is adapted to generate the code for the lighting effect using a generation function.

120. A system of claim 114, wherein the light management facility generates a configuration file for a plurality of light systems that stores at least one of the position, intensity, color, illumination characteristics, location, and type of the lighting system.

121. A system of claim 120, wherein the configuration file is generated by associating a lighting system with a location in an environment.

122. A system of claim 121, wherein the environment is selected from the group consisting of a building, a wall, a room, a hallway, a corridor, a ceiling, a floor, a transportation environment, a vehicle exterior, a vehicle interior, an indoor environment, an outdoor environment, a pool, a spa, an office, a park, a theme park, and an entertainment venue.

123. A system of claim 120, wherein the configuration file is generated by associating a plurality of addressable light systems with surfaces that are lit by the light systems.

124. A system of claim 114, wherein the controller is adapted to add light as an instance to at least one object of the computer application.

125. A system of claim 124, wherein the controller is further adapted to add light as an instance by adding a light thread to the computer application.

126. A system of claim 114, wherein the controller is adapted to generate code for the lighting control signal based on code for the computer application.

127. A system of claim 114, wherein the controller is adapted to add a control signal for a lighting system to a signal generated by the computer application.

128. A system of claim 114, wherein the controller is adapted to use an algorithm of the computer application to generate the lighting control signal.

129. A system of claim 114, wherein the control signal generator is further adapted to provide a control signal for another system.

130. A system of claim 129, wherein the other system is selected from the group consisting of a lighting system, lighting network, light, LED, LED lighting system, audio system, surround sound system, fog machine, rain machine, and an electromechanical system.

131. A system for controlling an illumination system having a plurality of addressable light systems for illuminating a space, comprising:

a computer application adapted to provide graphical information which represents at least one illumination effect, wherein the graphical information comprises at least one of a drawing; a photograph; a static image; and a dynamic image;

an association system adapted to associate the plurality of addressable light systems in the space; and a converter adapted to convert the graphical information to control signals to control the light systems to illuminate the space to generate the illumination effect represented by the graphical information.

132. A system of claim 131, wherein the light systems are associated with their locations in the environment.

133. A system of claim 131, wherein the light systems are associated with locations that the light systems illuminate in the environment.

134. A system of claim 131, further comprising a transmitter adapted to communicate control signals to a lighting network comprising a plurality of addressed light systems.

135. A system of claim 131, wherein the converter is further adapted to coordinate another control signal with the lighting control signals.

136. A system of claim 131, wherein the light systems are networked light systems and wherein the control signals are packaged into packets of addressed information.

137. A system of claim 136, wherein the addressed information is communicated to the light systems in the lighting network and each of the light systems responds to the control signals that are addressed to the particular lighting system.

138. A system of claim 131, wherein the graphical information is selected from the group consisting of a drawing, photograph, a static image, a dynamic image, and a generated image.

139. A system of claim 138, wherein the graphical information is displayed on a computer screen.

140. A system of claim 131, wherein the computer application is adapted to generate the graphical information.

141. A system of claim 140, wherein the graphical information is generated using at least one of bitmaps and vector coordinates.

142. A system of claim 140, wherein the graphical information is rendered in 3D space.

143. A system of claim 140, wherein the graphical information is generated by a function.

144. A system of claim 143, wherein the function represents an image selected from the group consisting of lights swirling in a room, balls of light bouncing in a room, and sounds bouncing in a room.

145. A system of claim 143, wherein the function represents randomly generated effects.

146. A system of claim 143, wherein the function relates to an input to the system.

147. A system of claim 146, wherein the input comprises at least one of information, a file, music, a signal, a data stream, a voice stream, a wireless data stream, and a sensed condition.

148. A system of claim 131, wherein the computer application is adapted to provide the graphical information without the graphical information being displayed on a computer screen.

149. A system of claim 131, wherein the control signals include signals for controlling at least one of a color, an intensity, an area, and a propagation rate for an effect that is created using the lighting system.

150. A system of claim 149, wherein the control signals control an effect that simulates an event.

151. A system of claim 150, wherein the event is selected from the group consisting of an explosion, lighting strike, headlights, train passing through a room, bullet shot through a room, light moving through a room, sunrise across a room, or other event.

152. A system of claim 131, wherein the control signals are used to control the light systems to illuminate at a designated time.

153. A system of claim 131, wherein the association system is associated with a graphical user interface wherein the graphical user interface is used to associate the plurality of addressable light systems with locations in the environment.

154. A system of claim 153, wherein the graphical user interface includes a representation of a space.

155. A system of claim 154, wherein the space is selected from the group consisting of a room, a corridor, a hall, a building, a display, a booth, a theatre, a retail venue, a store, a shelf, an object, and a product.

156. A system of claim 131, further a position map generator adapted to generate a position map for the representation of a surface that is lit by a lighting system.

157. A system of claim 156, wherein the position map changes over time based on a change of a characteristic of a lighting system.

158. A system of claim 131, further comprising a screen for visualizing an effect on the screen prior to sending a control signal to control a lighting system.

159. A system of claim 131, wherein the converted is further adapted to coordinate another effect with the lighting effect.

160. A system of claim 159, wherein the other effect is selected from the group consisting of a sound effect, a computer effect, a sensory effect, and an information effect.

161. A system of claim 160, wherein the other effect is a sound effect and the sound effect is correlated with the lighting effect.

162. A system for controlling a plurality of addressable light systems, comprising:

an accessing system adapted to access a set of graphical information for producing a graphic;

an association system adapted to associate the plurality of addressable light systems with locations in an environment; and a computing system adapted to apply an algorithm to the graphical information to convert the graphical information to control signals for controlling the light systems to create a lighting effect in the environment in correspondence to the graphical information.

163. A system of claim 162, wherein the algorithm averages the information.

164. A system of claim 162, wherein the algorithm selects maximum information.

165. A system of claim 162, wherein the algorithm selects a quartile of the information.

166. A system of claim 162, wherein the algorithm calculates and selects the most used information.

167. A system of claim 162, wherein the algorithm calculates and selects an integral of the information.

168. A system of claim 162, wherein the algorithm is based on the effect of the lighting system in response to the information received.

169. A system of claim 162, wherein the graphical information is altered before the lighting systems responds to the graphical information.

170. A system of claim 162, wherein the information is in a format selected from a group consisting of a computer data format, a flash format, a 3D rendering format, a 2D graphics format, a USB format, a serial format, a wireless format, an IP format and a DMX format.

171. A system of claim 162, wherein more than one lighting system of the plurality of lighting systems is associated with a given location.

172. A system of claim 162, wherein different light systems reside in independent position areas.

173. A system of claim 162, wherein the plurality of light systems includes a first light system and a second light system wherein the position of a lighted surface from a first lighting system intersects with a lighted surface from a second lighting system.

174. A system of claim 173, wherein control signal is adapted to control at least one of the first and second light systems such that the intersected lighted area is controlled.

175. A system of claim 162, further comprising:

wherein the associating system includes a graphical user interface wherein a user can graphically associate the light system with the location.

176. A system of claim 175, wherein the graphical user interface is adapted to represent the light systems in a two-dimensional view.

177. A system of claim 175, wherein the graphical user interface is adapted to represent the light systems in a 3D view.

178. A system of claim 175, wherein the graphical user interface is adapted to represent the light systems in a plane wherein the light systems can be associated with various pixels.

179. A system of claim 175, further wherein the association system further comprises a vector generator adapted to generate vector graphics to model animated effects by controlling pixels on a display screen.

180. A system of claim 179, wherein the computing system generates control signals adapted to cause the light systems to generate effects that correspond to the animated effects modeled by the vector graphics.

181. A system of claim 175, wherein the associating system is further adapted to map pixels of an animated effect to light systems in an environment.

182. A system of claim 181, wherein the animated effects are displayed on the light systems in the environment.

183. A system of claim 182, wherein the effects are designed to be viewed by a viewer of the light systems.

184. A system of claim 182, wherein the effects are designed to be viewed by a viewer of a lighted surface that is lit by the light systems.

185. A system of claim 182, wherein the effect is selected from a group consisting of an explosion, fire, a missile, a ball, a wave, a pattern, a logo, a character, a number, a letter, a brand, a name, an underwater effect, turbulence, apparent motion of an environment, apparent rotation of an environment, motion of a shape, and a moving light.

186. A system of claim 185, wherein the effect is coupled with a sound effect.

187. A system of claim 175, wherein the graphical user interface has a representation that depicts attributes of the lighting system.

188. A system of claim 187, wherein the representation has coordinates reflecting the degrees of freedom of the attributes of the lighting system.

189. A system of claim 162, wherein the effect is generated using a parameter selected from the group consisting of a color, a wavelength, a width, a speed, a velocity, a direction, a spin, a phase, a peak-to-peak value, a color variation, a wave width, an amplitude, a frequency, a friction, an inertia, a trajectory and a momentum.

190. A system of claim 189, wherein the effect is coupled with a sound effect.

191. A system of claim 189, wherein at least one parameter of the effect is modified using an anti-aliasing technique.

192. A system of claim 189, wherein the effect is propagated as a wave through an environment.

193. A system of claim 192, wherein a lighting system for the effect is varied continuously in at least one of a saturation, an intensity and a hue to generate the propagation of the wave.

194. A system of claim 162, wherein a transmitting system communicates a signal for control of a non-lighting device, wherein the non-lighting device is selected from the group consisting of a pyrotechnic device, a smell-generating device, a fog machine, a bubble machine, a moving mechanism, a motor, and an acoustic device.

195. A system of for generating a lighting effect in an environment, comprising:

a non-lighting system adapted to generate an image by associating a plurality of light systems with positions in an environment; and a controller adapted to use the association of the light systems and the positions to convert the image into control signals for the light systems, wherein the light systems generate an effect that corresponds to the image.

196. A system of claim 195, wherein the image is generated using a program executed with a processor and wherein the image is displayed on a computer screen.

197. A system of claim 195, wherein illumination is displayed on a lighting system after a related image is displayed on the computer screen.

198. A system of claim 195, wherein illumination is displayed on a lighting system simultaneously with a related image being displayed on a computer screen.

199. A system of claim 195, wherein the image is an image selected from the group consisting of a brand, a logo, a character, an effect, an explosion, a person, a building, a room, a product, a polygon, a rainbow, a propagating plane, a vector, and a color chasing effect.

200. A system of claim 195, wherein the non-light system is adapted to convert the image into control signals by changing the format of the information used to generate the image into information used to generate a lighting control signal.

201. A system of claim 200, wherein the lighting control signal comprises a bit stream.

202. A system of claim 201, wherein the bit stream comprises signals for generation of at least two colors.

203. A system of claim 202, wherein the two colors are two colors of white of different color temperature.

204. A system of claim 195, wherein the lighting control signal controls light systems of red, green and blue color.

205. A system of claim 195, wherein the image comprises a color palette representing a plurality of colors.

206. A system of claim 205, wherein the non-light system is further adapted to enable a user to select a color from the color palette and selection a portion of the screen, and wherein the light system in a portion of an environment corresponding to the portion of the screen illuminate in a color corresponding to the color selected from the color palette.

207. A system of claim 195, wherein the information used to generate lighting control signals is the same information used to generate pixel information for display of an image on a computer screen.

208. A system for generating a control signal for a light system, comprising:

a light management facility adapted to map the positions of a plurality of light systems and to generate map files that map the positions of a plurality of light systems in response to user input;

an animation facility adapted to generate a plurality of graphics files representative of a lighting effect;

an association system adapted to associate the positions of the light systems in the map files with data in the graphics files; and generate a lighting control signal to control the light systems using data derived from the graphics files to reproduce the lighting effect as an output of the light systems.

209. A system of claim 208, wherein the animation facility is a flash animation facility.

210. A system of claim 208, wherein the animation facility is adapted to generate a sequence of 2D graphics files.

211. A system of claim 208, wherein the animation facility is adapted to generate a sequence of 3D graphics files.

212. A system of claim 211, wherein the 3D graphics files are associated with a vector in 3D space and wherein an effect is generated to move in a plane that is associated with the vector.

213. A system of claim 212, wherein the plane is normal to the vector.

214. A system of claim 208, wherein the graphics files and the map file are associated in an XML file.

215. A system of claim 208, wherein the graphics files and the map file are associated in a data stream.

216. A system of claim 208, wherein the lighting control signals are merged into an animation playback facility.

217. A system of claim 216, wherein the animation playback facility is a flash animation facility.

218. A system of claim 208, wherein the lighting control signal is a DMX format signal.

219. A system of claim 208, wherein the light systems are mapped to show positions that will be viewed directly by a viewer.

220. A system of claim 208, wherein the light systems are mapped to show positions that will be illuminated by the light systems.

221. A system of claim 208, further comprising a configuration system adapted to generate a file of the locations of a plurality of light systems.

222. A system of claim 221, wherein the configuration file accesses a database of light systems to obtain locations of the light systems.

223. A system of claim 208, wherein the light systems are movable light systems, and wherein the map file for the light systems is a time-dependent map file.

224. A system of claim 208, wherein the file stores data to generate a static image.

225. A system of claim 208, wherein the file stores further data associated with changes to the static image.

226. A system, comprising:

a light controller adapted to obtain a lighting control signal for a plurality of light systems in an environment;

a computer system adapted to obtain a graphics signal; and a configuration system adapted to modify the lighting control signal in response to the content of the graphics signal.

227. A system of claim 226, further comprising a mapping system adapted to obtain a position map for the light systems and modifying the lighting control signal in response to position information from the graphics signal.

228. A system of claim 227, wherein the mapping system is further adapted to collect all information directed to a given position prior to sending a signal for a lighting system of that position.

* * * * *

UNITED STATES PATENT AND TRADEMARK OFFICE

CERTIFICATE OF CORRECTION

PATENT NO. : 7,231,060 B2
APPLICATION NO. : 10/163164
DATED : June 12, 2007
INVENTOR(S) : Kevin J. Dowling et al.

It is certified that error appears in the above-identified patent and that said Letters Patent is hereby corrected as shown below:

On the title page, item 63, Related U.S. Application Data is replaced with the following:

--Continuation-in-part of application No. 09/971,367, filed on Oct. 4, 2001, now Pat. No. 6,788,011, which is a continuation of application No. 09/669,121, filed on Sep. 25, 2000, now Pat. No. 6,806,659, which is a continuation of application No. 09/425,770, filed on Oct. 22, 1999, now Pat. No. 6,150,774, which is a continuation of application No. 08/920,156, filed on Aug. 26, 1997, now Pat. No. 6,016,038, and a continuation-in-part of application No. 09/870,193, filed on May 30, 2001, now Pat. No. 6,608,453 and a continuation-in-part of application No. 09/815,418, filed on Mar. 22, 2001, now Pat. No. 6,577,080, which is a continuation of application No. 09/213,548, filed on Dec. 17, 1998, now Pat. No. 6,166,496, and a continuation-in-part of application No. 09/333,739, filed on Jun. 15, 1999, and a continuation-in-part of application No. 09/215,624, filed on Dec. 17, 1998, now Pat. No. 6,528,954, and a continuation-in-part of application No. 09/213,607, filed on Dec. 17, 1998, now abandoned, and a continuation-in-part of application No. 09/213,189, filed on Dec. 17, 1998, now Pat. No. 6,459,919, and a continuation-in-part of application No. 09/213,581, filed on Dec. 17, 1998, now Pat. No. 7,038,398, and a continuation-in-part of application No. 09/213,540, filed on Dec. 17, 1998, now Pat. No. 6,720,745, and a continuation-in-part of application No. 09/989,095, filed on Nov. 20, 2001, now Pat. No. 6,717,376, and a continuation-in-part of application No. 09/989,747, filed on Nov. 20, 2001, now Pat. No. 6,897,624, and a continuation-in-part of application No. 09/989,677, filed on Nov. 20, 2001, and a continuation-in-part of application No. 10/045,604, filed on Oct. 23, 2001.--

On the title page, item 57, ABSTRACT is replaced with the following:

--An embodiment of the invention is a system for generating control signals. The system may allow a user to generate an image, representation of an image, algorithm or other effect information. The effect information may then be converted to lighting control signals to be saved or communicated to a networked lighting system. An embodiment of the invention may enable the authoring, generation and communication of control signals such that an effect is generated in a space or area.--

UNITED STATES PATENT AND TRADEMARK OFFICE

CERTIFICATE OF CORRECTION

PATENT NO. : 7,231,060 B2
APPLICATION NO. : 10/163164
DATED : June 12, 2007
INVENTOR(S) : Kevin J. Dowling et al.

It is certified that error appears in the above-identified patent and that said Letters Patent is hereby corrected as shown below:

In the specification,

Column 1, line 64, “Ser. No. 09/989,677, filed Nov. 20, 2001, entitles entitled” should read --Ser. No. 09/989,677, filed Nov. 20, 2001, entitled--

In the claims,

Column 43, (claim 195) line 5, “A system of for generating” should read --A system for generating--

Signed and Sealed this

Eighth Day of July, 2008

Jon W. Dudas

JON W. DUDAS
*Director of the United States Patent and Trademark Office*